United States Patent
Tanaka

(10) Patent No.: US 12,452,266 B2
(45) Date of Patent: Oct. 21, 2025

(54) ABNORMAL COMMUNICATION DISCRIMINATION APPARATUS, ABNORMAL COMMUNICATION DISCRIMINATION METHOD, AND ABNORMAL COMMUNICATION RESPONSE SYSTEM

(71) Applicant: Hitachi, Ltd., Tokyo (JP)

(72) Inventor: Mayuko Tanaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 139 days.

(21) Appl. No.: 18/523,207

(22) Filed: Nov. 29, 2023

(65) Prior Publication Data
US 2024/0214400 A1    Jun. 27, 2024

(30) Foreign Application Priority Data
Dec. 22, 2022   (JP) .................................. 2022-205896

(51) Int. Cl.
*H04L 9/40* (2022.01)
*H04L 41/22* (2022.01)

(52) U.S. Cl.
CPC .......... *H04L 63/1416* (2013.01); *H04L 41/22* (2013.01); *H04L 63/1425* (2013.01)

(58) Field of Classification Search
None
See application file for complete search history.

(56) References Cited

U.S. PATENT DOCUMENTS

2018/0234446 A1*   8/2018   Conner .................. H04W 4/48

FOREIGN PATENT DOCUMENTS

JP    2019-205125 A    11/2019

OTHER PUBLICATIONS

Zi-Yue Wang, et al, "Intrusion Detection Method, Device, Device And Readable Storage Medium", Aug. 5, 2022, CN 114866296 A ( English Translation), pp. 1-28 (Year: 2022).*

* cited by examiner

Primary Examiner — Jonathan A Bui
(74) Attorney, Agent, or Firm — Baker Botts L.L.P.

(57) ABSTRACT

Provided is an abnormal communication discrimination apparatus which includes an eventual feature table for the evaluation of each abnormal communication detection event, and a statistical feature table for the evaluation of each condition in which a statistical amount of abnormal communication holds. The abnormal communication discrimination apparatus calculates an eventual evaluation value from each number of records to which the abnormal communication detection events of the eventual feature table are applicable, calculates a statistical evaluation value from each number of records each of which satisfies a condition that a statistical amount of abnormal communication holds, calculates a discrimination result evaluation value by applying a weighted linear sum of the eventual evaluation value and the statistical evaluation value, and performs, on the basis of the discrimination result evaluation value, discrimination of whether abnormal communication is caused by a cyber-attack or by a failure of an apparatus of the monitoring target system.

6 Claims, 21 Drawing Sheets

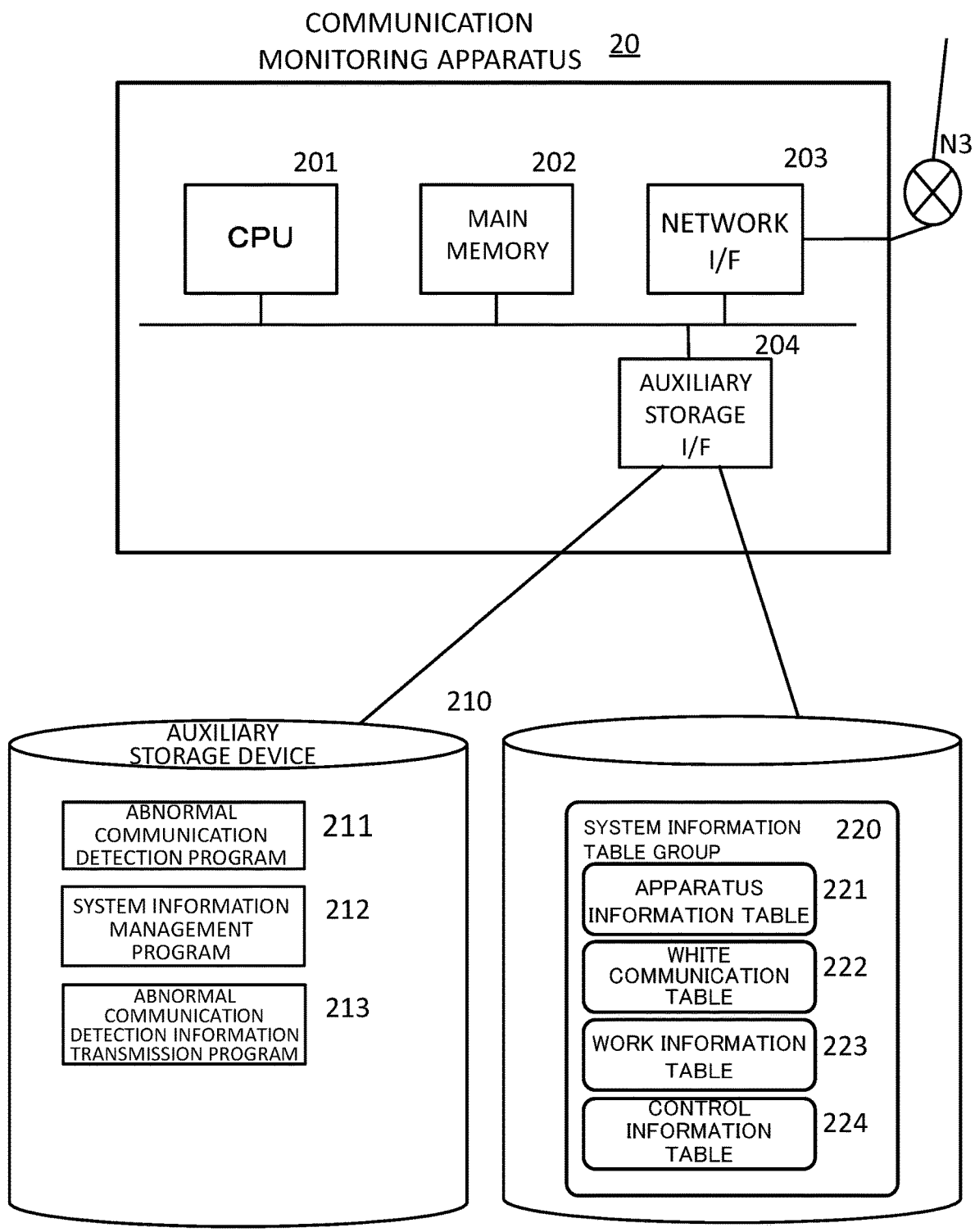

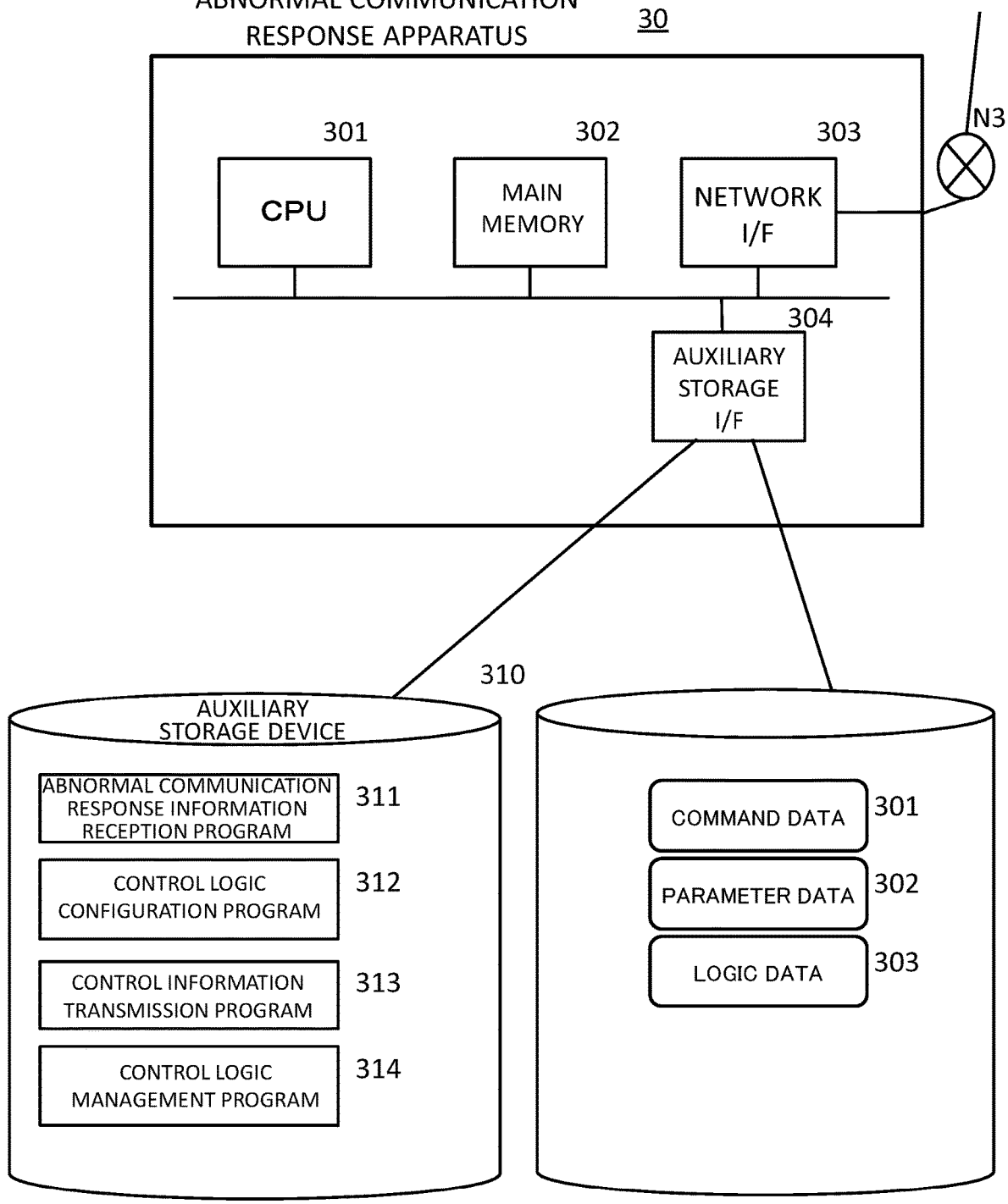

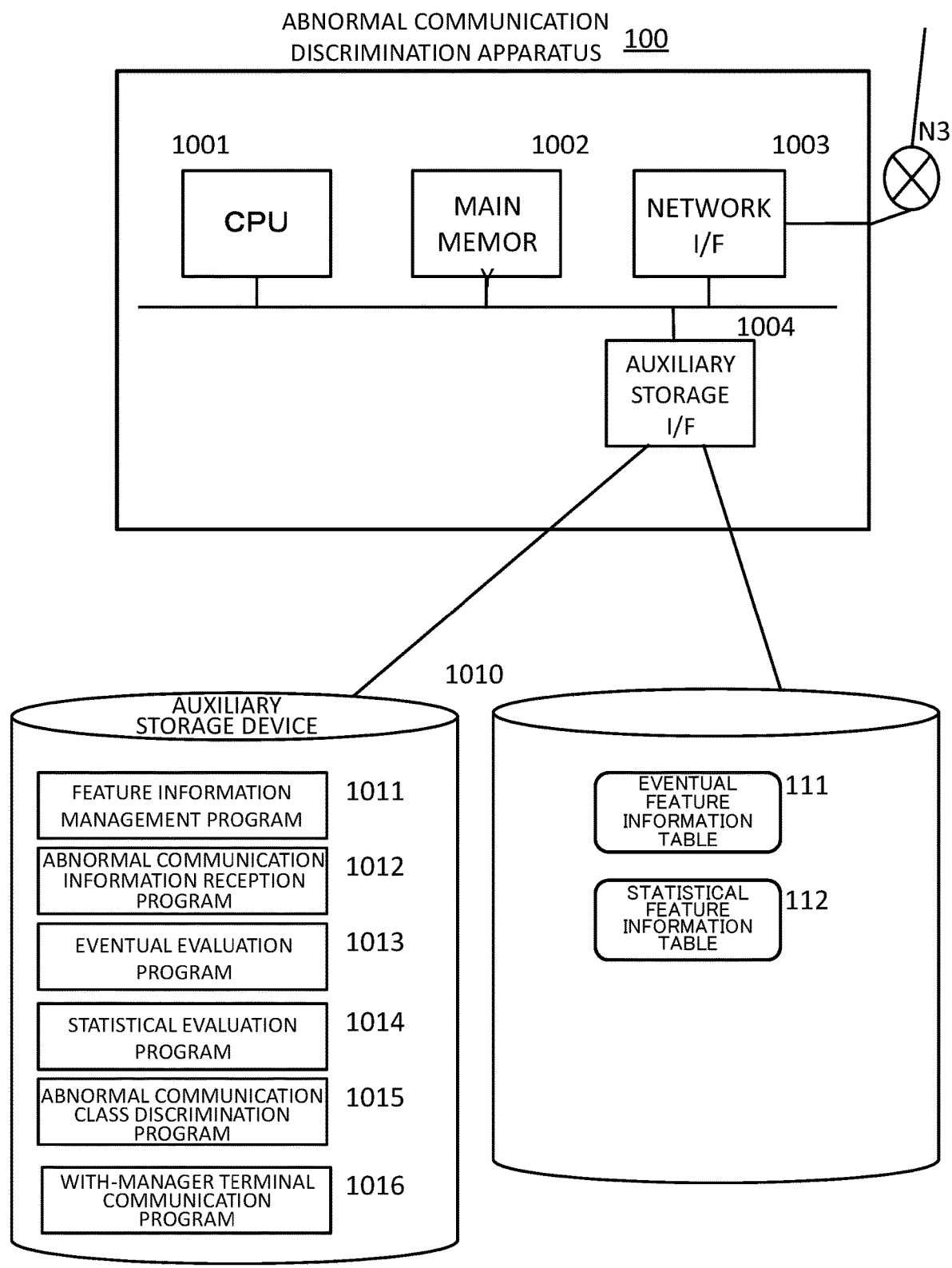

FIG. 7

APPARATUS INFORMATION TABLE 221

| 221a APPARATUS ID | 221b APPARATUS NAME | 221c IP ADDRESS | 221d ALTERNATIVE APPARATUS ID | 221e MODEL INFORMATION | 221f APPARATUS SPECIFICATION INFORMATION | 221g EXECUTION ENVIRONMENT REQUIREMENT INFORMATION | 221h WORK ID |
|---|---|---|---|---|---|---|---|
| D01 | CONTROLLER 61A | 10.0.10.10 | D04 | T2345 | RAM:2GB 2.0GHz | AC100V | W02 |
| D02 | CONTROLLER 61B | 10.0.10.20 | D03 | T3436 | RAM:4GB 2.4GHz | AC100V | W02 |
| D03 | CONTROLLER 61C | 10.0.10.30 | — | T3432 | RAM:1GB 1.4GHz | AC100V | W02 |
| D21 | ACTUATOR 12A | 10.0.10.15 | — | TA1267 | 3600RPM | 0°C~80°C | W04 |

FIG. 8

WHITE COMMUNICATION 222
TABLE

| 222a WHITE COMMUNICATION ID | 222b COMMUNICATION PROTOCOL | 222c TRANSMISSION SOURCE IP ADDRESS | 222d DESTINATION IP ADDRESS | 222e TRANSMISSION SOURCE PORT NUMBER | 222f DESTINATION PORT NUMBER |
|---|---|---|---|---|---|
| WH01 | Modbus/TCP | 10.0.10.41 | 10.0.10.51 | 200 | 202 |
| WH02 | MQTT | 10.0.10.43 | 10.0.10.53 | 210 | 212 |

FIG. 9

WORK INFORMATION 223
TABLE

| 223a | 223b | 223c | 223d | 223e |
|---|---|---|---|---|
| WORK ID | WORK NAME | OPERATION TIME | PRIORITY RANK | COMMUNICATION ID LIST |
| W02 | CAR BODY MANUFACTURE | 10:00–20:00 | 3 | C01, C02, C03 |
| W03 | ILLUMINATION UNIT MANUFACTURE | 10:00–20:00 | 5 | C11, C12, C13 |

FIG. 10

CONTROL INFORMATION TABLE  224

| 224a | 224b | 224c | 224d | 224e |
|---|---|---|---|---|
| COMMUNICATION ID | CONTROL PROTOCOL | CONTROL COMMAND | CONTROL PARAMETER | COMMUNICATION CYCLE |
| C02 | Modbus/TCP | FUEL VALVE CONTROL | OPEN, CLOSE | 100ms |
| C12 | MQTT | NOTIFICATION | SENSOR OUTPUT VALUE | 75ms |

FIG. 11

CONTROL COMMAND 80

| 80a CONTROL PROTOCOL | 80b CONTROL COMMAND | 80c CONTROL PARAMETER |
|---|---|---|
| Modbus/TCP | FUEL VALVE CONTROL | OPEN, CLOSE |
| Modbus/TCP | PRESSURE VALVE CONTROL | OPEN, CLOSE |
| MQTT | NOTIFICATION | SENSOR OUTPUT VALUE |

FIG. 12

EVENTUAL FEATURE INFORMATION TABLE 111

| ABNORMAL COMMUNICATION DETECTION EVENT ID (111a) | ABNORMAL COMMUNICATION DETECTION EVENT (111b) | DISCRIMINATION EVENT (111c) | DISCRIMINATION EVENT CLASS (111d) |
|---|---|---|---|
| C1 | CONTROL ABNORMAL COMMUNICATION (ISSUANCE OF COMMAND NOT PERMITTED) | FALSIFICATION OF CONTROL COMMUNICATION (ILLEGAL COMMAND) | CYBER-ATTACK |
| C2 | CONTROL ABNORMAL COMMUNICATION (INCOMPATIBLE WITH WORK) | FALSIFICATION OF CONTROL COMMUNICATION (ILLEGAL PARAMETER) | CYBER-ATTACK |
| C2 | CONTROL ABNORMAL COMMUNICATION (INCOMPATIBLE WITH WORK) | CONTROLLER FAILURE | FAILURE |
| C3 | CONTROL ABNORMAL COMMUNICATION (PARAMETER VALUE OTHER THAN PRESCRIBED VALUE) | FALSIFICATION OF CONTROL COMMUNICATION (PARAMETER ABNORMAL) | CYBER-ATTACK |
| C3 | CONTROL ABNORMAL COMMUNICATION (PARAMETER VALUE OTHER THAN PRESCRIBED VALUE) | CONTROLLER FAILURE | FAILURE |
| C4 | CONTROL ABNORMAL COMMUNICATION (PARAMETER VALUE EXCEEDING SAFE RANGE) | FALSIFICATION OF CONTROL COMMUNICATION (PARAMETER ABNORMAL) | CYBER-ATTACK |
| P1 | SENSOR OUTPUT ABNORMALITY (OUTPUT VALUE FIXED) | FALSIFICATION OF SENSOR OUTPUT VALUE | CYBER-ATTACK |
| P1 | SENSOR OUTPUT ABNORMALITY (OUTPUT VALUE FIXED) | SENSOR FAILURE | FAILURE |
| P2 | SENSOR OUTPUT ABNORMALITY (OUTPUT VALUE FLUCTUATES GREATLY) | FALSIFICATION OF SENSOR OUTPUT VALUE | CYBER-ATTACK |
| P3 | SENSOR OUTPUT ABNORMALITY (OUTPUT VALUE INCOMPATIBLE WITH CONTROL) | FALSIFICATION OF SENSOR OUTPUT VALUE | CYBER-ATTACK |
| P4 | SENSOR OUTPUT ABNORMALITY (OUTPUT VALUE DEVIATED) | SENSOR FAILURE | FAILURE |
| P5 | SENSOR OUTPUT ABNORMALITY (MUCH NOISE IN OUTPUT VALUE) | SENSOR FAILURE | FAILURE |

FIG. 13

STATISTICAL FEATURE INFORMATION TABLE  112

| 112a | 112b | 112c | 112d | 112e |
|---|---|---|---|---|
| STATISTICAL FEATURE ID | STATISTICAL FEATURE | DISCRIMINATION CONDITION | CONDITIONAL EXPRESSION | DISCRIMIN-ATION EVENT CLASS |
| SC1 | SUDDEN INCREASE IN ABNORMAL COMMUNICATION | ・CONDITION 1: INCREASE AMOUNT OF ABNORMAL COMMUNICATION PER UNIT TIME ≥ THRESHOLD VALUE 1<br>・CONDITION 2: INCREASE AMOUNT OF ABNORMAL COMMUNICATION PER UNIT TIME IN SPECIFIC COMMUNICATION ≥ THRESHOLD VALUE 2 | CONDITION 1 OR CONDITION 2 | CYBER-ATTACK |
| SC2 | LARGE NUMBER OF SAME TYPE ABNORMAL COMMUNICATION OCCUR AT MULTIPLE PLACES | ・CONDITION 3: NUMBER OF GENERATION SOURCES OF ABNORMAL COMMUNICATION OF SAME TYPE PER UNIT TIME ≥ THRESHOLD VALUE 3<br>・CONDITION 4: NUMBER OF OCCURRENCES OF ABNORMAL COMMUNICATION OF SAME TYPE PER UNIT TIME ≥ THRESHOLD VALUE 4 | CONDITION 3 AND CONDITION 4 | CYBER-ATTACK |
| SC3 | ABNORMAL COMMUNICATION OCCURS IN LARGE NUMBER OF SAME MODELS | ・CONDITION 5: NUMBER OF GENERATION SOURCE APPARATUSES OF ABNORMAL COMMUNICATION OCCURRING IN SAME TYPE APPARATUS PER UNIT TIME ≥ THRESHOLD VALUE 5<br>・CONDITION 6: NUMBER OF OCCURRENCES OF ABNORMAL COMMUNICATION WHOSE GENERATION SOURCE IS SAME TYPE APPARATUS PER UNIT TIME ≥ THRESHOLD VALUE 6 | CONDITION 5 AND CONDITION 6 | CYBER-ATTACK |
| SP1 | ABNORMAL COMMUNICATION OCCURS IN SINGLE OR PLURALITY OF SAME MODELS | ・CONDITION 7: NUMBER OF GENERATION SOURCES OF SAME TYPE ABNORMAL COMMUNICATION PER UNIT TIME ≥ 1<br>・CONDITION 8: NUMBER OF GENERATION SOURCES OF SAME TYPE ABNORMAL COMMUNICATION PER UNIT TIME < THRESHOLD VALUE 8<br>・CONDITION 9: NUMBER OF OCCURRENCES OF SAME TYPE ABNORMAL COMMUNICATION PER UNIT TIME < THRESHOLD VALUE 9 | CONDITION 7 AND CONDITION 8 AND CONDITION 9 | FAILURE |

FIG. 14

DISCRIMINATION RESULT INFORMATION DATA
500

500a
- ABNORMAL COMMUNICATION DETECTION EVENT INFORMATION
  - INFORMATION OF ABNORMAL COMMUNICATION DETECTION EVENT: ABNORMAL COMMUNICATION DETECTION EVENT ID, ABNORMAL COMMUNICATION DETECTION EVENT
  - INFORMATION OF ABNORMAL COMMUNICATION : TRANSMISSION SOURCE IP ADDRESS, DESTINATION IP ADDRESS, TRANSMISSION SOURCE PORT NUMBER, DESTINATION PORT NUMBER
  - APPARATUS INFORMATION: TRANSMISSION SOURCE APPARATUS NAME, DESTINATION APPARATUS NAME

500b
- DISCRIMINATION INFORMATION
  - EVENTUAL FEATURE EVALUATION RESULT
    - ABNORMAL COMMUNICATION DETECTION EVENT ID
    - DISCRIMINATION EVENT INFORMATION LIST: LIST OF DISCRIMINATION EVENTS AND DISCRIMINATION EVENT CLASSES LINKED TO ABNORMAL COMMUNICATION DETECTION EVENT
    - EVENTUAL EVALUATION VALUE
  - STATISTICAL FEATURE EVALUATION RESULT
    - STATISTICAL FEATURE LIST: LIST OF STATISTICAL FEATURES AND DISCRIMINATION EVENT CLASSES SATISFYING CONDITION EXPRESSION
    - STATISTICAL FEATURE EVALUATION VALUE
  - DISCRIMINATION RESULT INFORMATION: DISCRIMINATION RESULT VALUE, DISCRIMINATION RESULT

FIG. 15

ABNORMAL COMMUNICATION RESPONSE INFORMATION TABLE 400

| RESPONSE INFORMATION ID (400a) | ABNORMAL COMMUNICATION DETECTION EVENT (400b) | EVENT CLASS (400c) | RESPONSE PLAN (400d) |
|---|---|---|---|
| PC01 | CONTROL ABNORMAL COMMUNICATION (INCOMPATIBLE WITH WORK) | CYBER-ATTACK | RESPONSE PLAN 1: SWITCH TRANSMISSION SOURCE APPARATUS TO ALTERNATIVE APPARATUS |
| PC02 | CONTROL ABNORMAL COMMUNICATION (INCOMPATIBLE WITH WORK) | CYBER-ATTACK | RESPONSE PLAN 2: STOP CONTROL COMMUNICATION FROM TRANSMISSION SOURCE APPARATUS |
| PF01 | CONTROL ABNORMAL COMMUNICATION (INCOMPATIBLE WITH WORK) | FAILURE | RESPONSE PLAN 1: RESTART TRANSMISSION SOURCE APPARATUS |
| PF02 | CONTROL ABNORMAL COMMUNICATION (INCOMPATIBLE WITH WORK) | FAILURE | RESPONSE PLAN 2: EXECUTE FAILURE DIAGNOSIS ON APPLICABLE TRANSMISSION SOURCE APPARATUS |
| PC11 | CONTROL ABNORMAL COMMUNICATION (PARAMETER VALUE OTHER THAN PRESCRIBED VALUE) | CYBER-ATTACK | RESPONSE PLAN 1: SWITCH TRANSMISSION SOURCE APPARATUS TO ALTERNATIVE APPARATUS |
| PC12 | CONTROL ABNORMAL COMMUNICATION (PARAMETER VALUE OTHER THAN PRESCRIBED VALUE) | CYBER-ATTACK | RESPONSE PLAN 2: STOP CONTROL COMMUNICATION FROM TRANSMISSION SOURCE APPARATUS |
| PF11 | CONTROL ABNORMAL COMMUNICATION (PARAMETER VALUE OTHER THAN PRESCRIBED VALUE) | FAILURE | RESPONSE PLAN 1: EXECUTE FAILURE DIAGNOSIS ON APPLICABLE TRANSMISSION SOURCE APPARATUS |
| PF12 | CONTROL ABNORMAL COMMUNICATION (PARAMETER VALUE OTHER THAN PRESCRIBED VALUE) | FAILURE | RESPONSE PLAN 2: EXECUTE SAFE STOP ON APPLICABLE TRANSMISSION SOURCE APPARATUS |

ABNORMAL COMMUNICATION DISCRIMINATION APPARATUS, ABNORMAL COMMUNICATION DISCRIMINATION METHOD, AND ABNORMAL COMMUNICATION RESPONSE SYSTEM

BACKGROUND OF THE INVENTION

1. Field of the Invention

The present invention relates to an abnormal communication discrimination apparatus, an abnormal communication discrimination method, and an abnormal communication response system, and particularly, to an abnormal communication discrimination apparatus, an abnormal communication discrimination method, and an abnormal communication response system that are suitable to discriminate, when an abnormality occurs in communication regarding a work, whether the abnormality is caused by a cyber-attack or by a failure of an apparatus.

2. Description of the Related Art

In a situation where the Internet is spread explosively and hardware of a personal computer (PC), a smartphone, and so forth progresses rapidly, communication is essentially required in the social life of enterprises and people.

In such a situation as just described, a cyber-attack is concerned as a significant risk to the information society. The cyber-attack is an action of performing falsification, destruction, theft, or the like on saved data in a computer such as a server, a PC, or a smartphone through a network such as the Internet. Especially, the cyber-attack, in recent years, is a threat that may possibly harm any enterprise due to complication and sophistication of the cyber-attack, and a cyber-attack countermeasure (cyber security) for response to such a cyber-attack as just described are a significant item that should be worked on not only restrictively by an information system department or the like but also by overall enterprises as a management subject.

As the technology relating to countermeasures against cyber-attacks, for example, a technology disclosed in JP-2019-205125-A is available. An abnormality cause decision apparatus disclosed in JP-2019-205125-A is provided in a control system that includes a control apparatus, and saves therein control state data (FIG. 2, paragraph "0021") including a control state that indicates an operation state of the control apparatus, and discriminates, on the basis of the control state data, whether the cause of an abnormality occurring in the control system is an attack through a network or a failure of equipment (FIG. 3, paragraphs "0024" and "0025").

SUMMARY OF THE INVENTION

The technology disclosed in JP-2019-205125-A discloses a method of discriminating whether the cause of an abnormality occurring in the controlling system is an attack through a network or a failure of equipment on the basis of a control state indicative of an operation state of the control apparatus.

However, in the decision of abnormal communication disclosed in JP-2019-205125-A, abnormality detection and cause decision that take the control state of the control apparatus into consideration are performed (paragraph "0024"). For example, even when the control apparatus is "currently stopped," where the control apparatus serves as a starting point of communication, the abnormality factor discrimination apparatus decides that the cause of the attack is "impersonation." On the other hand, when the control apparatus is "in operation" and besides a communication that requests for rewriting of a program is detected, it is decided that the cause of the attack is an illegal operation (paragraph "0025").

Therefore, in the decision of abnormal communication disclosed in JP-2019-205125-A, where an attack that abuses controlling communication that occurs in execution of a work or communication of a sensor output or the like, for example, a DOS attack/DDoS attack, is performed for a specific target, it cannot be decided whether the abnormal communication is caused by a cyber-attack or by a failure of an apparatus.

It is to be noted that JP-2019-205125-A describes in paragraph: "the analysis section 142, when detecting an abnormality through detection of an abnormality by analyzing matching of network data with abnormality patterns, a degree of deviation of network data from that in a normal state, or the like, may discriminate whether the cause of the abnormality is an attack or a failure." However, although the analysis section 142 analyzes whether the communication is normal or abnormal, it does not decide whether the abnormal communication is caused by a cyber-attack or a failure of an apparatus.

It is an object of the present invention to provide an abnormal communication discrimination apparatus, an abnormal communication discrimination method, and an abnormal communication response system that can easily and reasonably discriminate, when an abnormality occurs in communication regarding a work, whether the abnormality is caused by a cyber-attack or a failure of an apparatus.

According to the present invention, there is provided an abnormal communication discrimination apparatus that discriminates a cause of abnormal communication detected in a monitoring target system in which an apparatus operates, the abnormal communication discrimination apparatus: retaining therein an eventual feature table that retains therein records each of which stores, for each abnormal communication detection event, a discrimination event class indicative of whether abnormal communication is caused by a cyber-attack or by a failure of the apparatus of the monitoring target system, and a statistical feature table that retains therein records each of which stores, for each condition in which a statistical amount of abnormal communication holds, a discrimination event class indicative of whether abnormal communication is caused by a cyber-attack or by a failure of the apparatus of the monitoring target system; receiving abnormal communication detection information in the monitoring target system; calculating, on the basis of the received abnormal communication detection information, an eventual evaluation value from each number of records to which the abnormal communication detection events of the eventual feature table are applicable and in which a value of the discrimination event class indicates whether abnormal communication is caused by a cyber-attack or by a failure of the apparatus of the monitoring target system; calculating a statistical amount of abnormal communication from the received abnormal communication detection information; calculating, on the basis of the calculated statistical amount of abnormal communication, a statistical evaluation value from each number of records each of which satisfies a condition that a statistical amount of abnormal communication of the statistical feature table holds, the each number indicating whether abnormal communication is caused by a cyber-attack or by a failure of the apparatus of the monitoring target system; and calculating, on the basis of the eventual evaluation value and the statistical evaluation value, a discrimination result evaluation value indicative of whether abnormal communication is caused by a cyber-attack or by a failure of the apparatus of the monitoring target system, and performing, on the basis of the discrimination result evaluation value, discrimination of whether abnormal communication is caused by a cyber-attack or by a failure of the apparatus of the monitoring target system.

With the present invention, an abnormal communication discrimination apparatus, an abnormal communication discrimination method, and an abnormal communication response system can be provided which can easily and reasonably discriminate, when an abnormality occurs in communication regarding a work, whether the abnormality is caused by a cyber-attack or a failure of an apparatus.

BRIEF DESCRIPTION OF THE DRAWINGS

FIG. 6A is a hardware-software block diagram of the communication monitoring apparatus;

FIG. 6B is a hardware-software block diagram of the abnormal communication response apparatus;

FIG. 6C is a hardware-software block diagram of the manager terminal;

FIG. 7 is a view depicting an example of an apparatus information table;

FIG. 8 is a view depicting an example of a white communication table;

FIG. 9 is a view depicting an example of a work information table;

FIG. 10 is a view depicting an example of a control information table;

FIG. 11 is a view depicting an example of a control command;

FIG. 12 is a view depicting an example of an eventual feature information table;

FIG. 13 is a view depicting an example of a statistical feature information table;

FIG. 14 is a view depicting an example of discrimination result information data;

FIG. 15 is a view depicting an example of an abnormal communication response information table;

DESCRIPTION OF THE PREFERRED EMBODIMENTS

The present invention relates to Strategic Innovation Creation Program (SIP) Phase 2 "cyber physical security compatible with IOT society" of the Council for Science, Technology and Innovation promoted by New Energy and Industrial Technology Development Organization (NEDO).

In the following, an embodiment of the present invention is described with reference to FIGS. 1 to 18

First, a configuration of an abnormal communication response system according to the embodiment is described with reference to FIGS. 1 to 6D.

The abnormal communication response system of the present embodiment is a system that discriminates whether abnormal communication detected by a cyber-physical system is an abnormality arising from a cyber-attack or an abnormality arising from a failure.

Here, the cyber-physical system is a system that collects information of the physical world that is reality on a computer system that is the cyber world, analyzes the collected information, and feeds back a result of the analysis to the physical world so as to be utilized. The present embodiment describes a cyber-physical system, taking a factory IoT system, which analyzes information collected from sensors and controls production on the basis of the analyzed information, as an example. It is to be noted that the Internet of Things (IoT) is a mechanism in which various "things" are connected to the Internet and exchange information to control each other.

Figure 1:
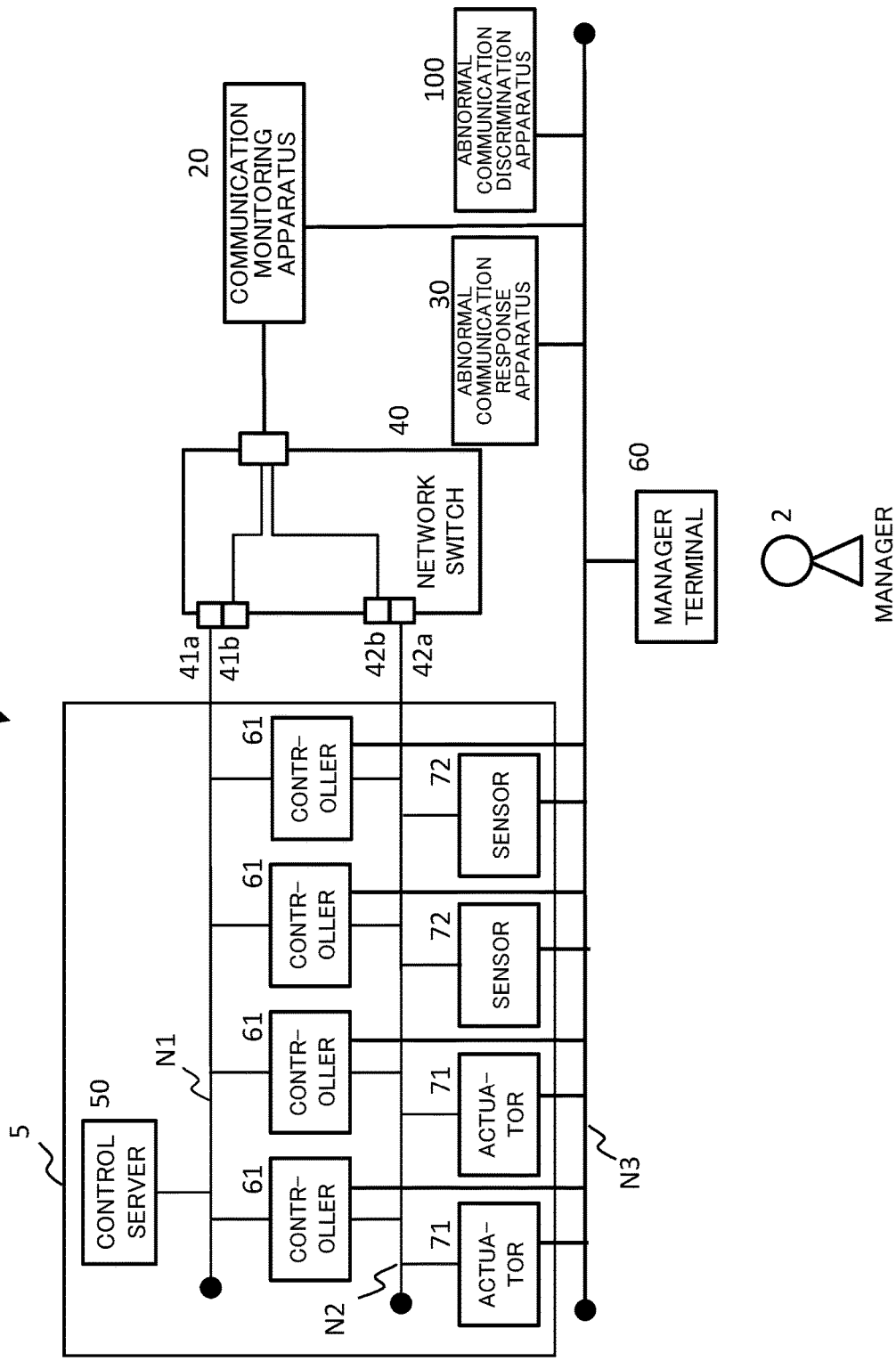
FIG. 1 is a block diagram of an abnormal communication response system.

Referring to FIG. 1, an abnormal communication response system 1 includes a monitoring target system 5, a communication monitoring apparatus 20, an abnormal communication response apparatus 30, a network switch 40, a manager terminal 60, and an abnormal communication discrimination apparatus 100.

The abnormal communication response system 1 has a function of evaluating abnormal communication, in the monitoring target system 5, detected by the communication monitoring apparatus 20 and discriminating, on the basis of a result of the evaluation, whether the abnormal communication is caused by a cyber-attack or by a failure of an apparatus that configures the monitoring target system 5. It is to be noted that the logic for evaluating abnormal communication is hereinafter described in detail.

The monitoring target system 5 is an IoT system and is configured including a single or a plurality of controllers 61, a single or a plurality of actuators 71, a single or a plurality of sensors 72, and a control server 50.

The apparatus included in the monitoring target system 5 functions as information processing apparatus that can perform bidirectional communication through a communication network.

The control server 50 and the controllers 61 are connected to each other by a first network N1 such that they can communication with each other. Further, the controllers 61, the actuators 71, and the sensors 72 are connected to each other by a second network N2 such that they can communicate with each other. In a case where the monitoring target system 5 is an industrial IoT system, the first network N1 is a control network that uses such a communication protocol as Modbus and the second network N2 is a field network that uses such a communication protocol as the Message Queuing Telemetry Transport (MQTT). It is to be noted that the field network is a network that connects, from a higher order personal computer/server that summarizes operation situations and the like, to controllers such as a programmable logic controller (PLC) that controls devices, sensors and measuring instruments that monitor conditions, drive equipment such as a servomotor used for positioning, and so forth, in the factory automation (FA) industry.

The control server 50 is a server apparatus that has a function of monitoring operation of the overall monitoring target system 5 through the first network N1. The control server 50 may have a function of performing change and update of the logic of a control program that operates on the server or the controllers 61.

The controllers 61 perform control for making the actuators 71 and the sensors 72, which are connected thereto through the second network N2, operate in accordance with an instruction command received from the control server 50 through the first network N1. The controller 61 is a PLC or the like that sets a set value for operation such as a rotation speed of a motor to the actuator 71 and collects information outputted from the sensors 72, in accordance with an instruction of the control server.

The actuators 71 are mechanical elements each actively performing a physical motion on the basis of an instruction from the controller 61. The actuators 71 are, for example, equipment that actually operates valves, motors, electric motors, or the like in accordance with a set value set on the basis of the instruction from the controller 61.

Each of the sensors 72 is a device that measures a temperature, a flow rate, a pressure, or the like and outputs the measured value.

As depicted in FIG. 1, the communication monitoring apparatus 20, the abnormal communication response apparatus 30, the manager terminal 60, and the abnormal communication discrimination apparatus 100 are connected for bidirectional communication to the actuators 71 and the sensors 72 through a management system network N3.

The first network N1 and the second network N2 are connected to a monitor port 41a and another monitor port 42a of the network switch 40, respectively, and the communication monitoring apparatus 20 is connected to a mirror port 41b and another mirror port 42b of the network switch 40. The network switch 40 copies (mirroring) a packet of the first network N1 received at the monitor port 41a thereof and transmits the copied packet from the mirror port 41b thereof to the communication monitoring apparatus 20. Further, the network switch 40 copies a communication packet of the second network N2 received at the monitor port 42a thereof and transmits the copied communication packet from the mirror port 42b thereof to the communication monitoring apparatus 20.

The communication monitoring apparatus 20 collects, through the mirror ports 41b and 42b, communication packets in the first network N1 and the second network N2 of the monitoring target system 5 and analyzes the communication packets to detect abnormal communication in the first network N1 and the second network N2.

The abnormal communication response apparatus 30 is connected to the monitoring target system 5 and the abnormal communication discrimination apparatus 100 through the management system network N3 such that it communicates with them. The abnormal communication response apparatus 30 has a processing authority for the apparatus of the monitoring target system 5. In particular, the abnormal communication response apparatus 30 receives a response instruction from the manager terminal 60, converts the received response instruction into a control command or a control logic program that can be executed or processed by the applicable response target apparatus and transmits the resulting control command or control logic program to the apparatus (the controllers 61, the actuators 71, and the sensors 72) of the monitoring target system 5 such that the applicable apparatus executes a process for response to the abnormal communication.

The abnormal communication discrimination apparatus 100 evaluates, on the basis of the abnormal communication detection information received from the communication monitoring apparatus 20, the abnormal communication from two points of view including an eventual point of view and a statistical point of view, discriminates, on the basis of a result of the evaluation, whether the abnormal communication is caused by a cyber-attack or by a failure of the apparatus, generates discrimination result information including a result of the discrimination and transmits the discrimination result information to the manager terminal 60.

The manager terminal 60 is connected to the abnormal communication discrimination apparatus 100 and the abnormal communication response apparatus 30 through the management system network N3 such that they communicate with them. The manager terminal 60 displays and presents, on the basis of the discrimination result of the abnormal communication received from the abnormal communication discrimination apparatus 100, response plans suitable for the cause of the abnormal communication and the discrimination result, to a manager 2. Further, the manager terminal 60 transmits response information with the abnormal communication to the abnormal communication response apparatus 30 in accordance with selection of a response plan by the operator from within the presentation contents.

It is to be noted that each of the first network N1, the second network N2, and the management system network N3 can be configured as a wired or wireless communication network such as a local area network (LAN), a wide area network (WAN) like the Internet, or a dedicated line.

Now, a functional configuration of the apparatus of the abnormal communication response system is described with reference to FIGS. 2 to 5.

The communication monitoring apparatus 20 is an apparatus that collects communication packets of the monitoring target system 5, analyzes the communication packets to detect abnormal communication, and transmits abnormal communication detection information to the abnormal communication discrimination apparatus 100.

Figure 2:
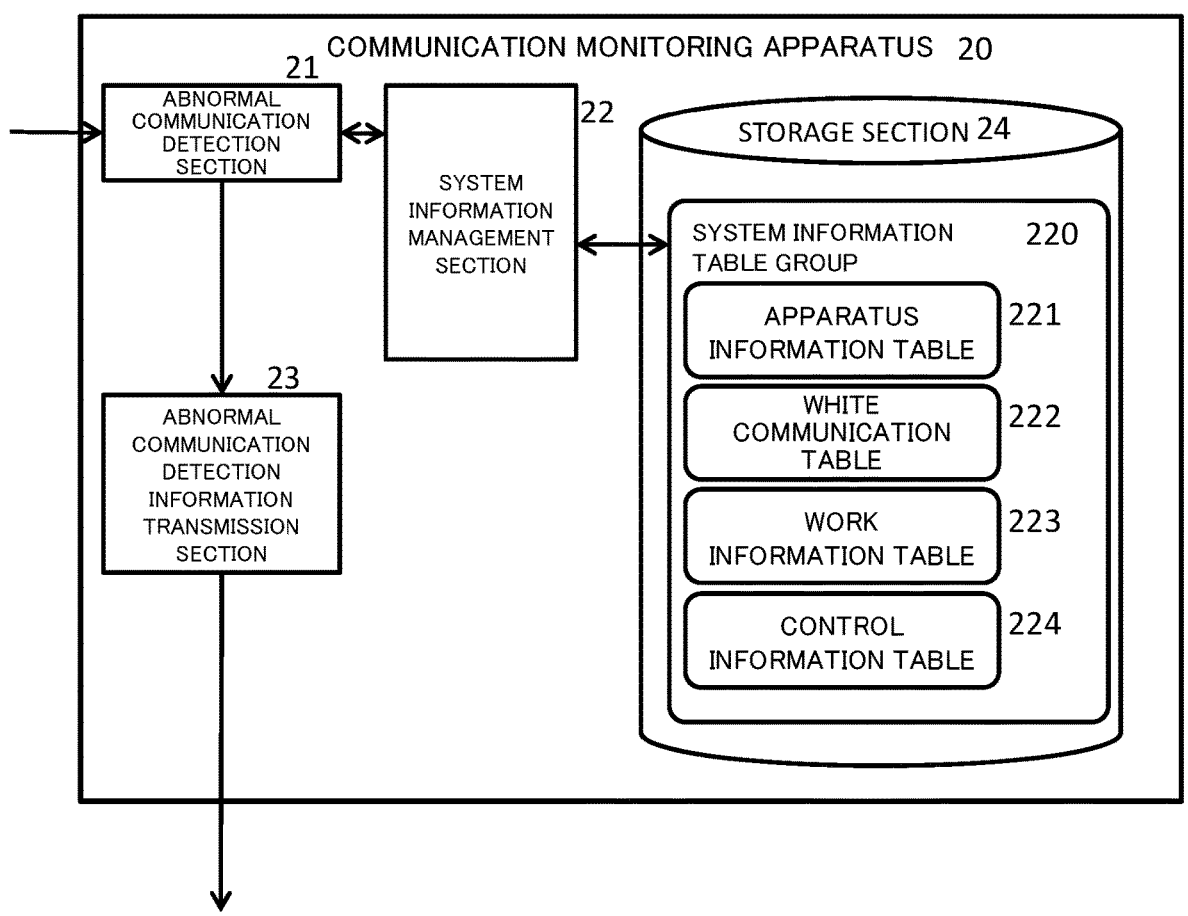
FIG. 2 is a functional block diagram of a communication monitoring apparatus.

Referring to FIG. 2, the communication monitoring apparatus 20 includes, as the functional configuration, an abnormal communication detection section 21, a system information management section 22, an abnormal communication detection information transmission section 23, and a storage section 24.

The abnormal communication detection section 21 collects communication packets sent from the mirror ports 41b and 42b of the network switch 40 to the first network N1 and the second network N2 of the monitoring target system 5. Then, the abnormal communication detection section 21 analyzes the collected communication packets to acquire (1) header information (an IP address of each of an apparatus of a data transmission source and an apparatus of a data transmission destination, a communication protocol, a port number, and so forth), and (2) control commands and (3) parameters included in the payload. Further, the abnormal communication detection section 21 generates (4) statistical information such as a change of the number of communication, relating to the control commands.

Then, the abnormal communication detection section 21 compares specifications of the monitoring target system 5 indicated by a system information table group 220 accessed through the system information management section 22 hereinafter described and the analysis information of the items (1) to (4) above with each other to decide whether or not the communication in the monitoring target system 5 is abnormal communication. Then, in a case where the abnormal communication detection section 21 decides that the communication in the monitoring target system 5 is abnormal communication, it transmits the abnormal communication information including information relating to the abnormal communication to the abnormal communication detection information transmission section 23.

The abnormal communication is decided, for example, from such events that the transmission amount of communication packets from a particular line or apparatus is abnormally great, and that an apparatus operation parameter deviates from its normal range.

The information relating to abnormal communication includes general information of the communication, information that abnormal communication is detected, and information on a detection event detected by the system.

The abnormal communication detection information transmission section 23 transmits the received abnormal communication information to the abnormal communication discrimination apparatus 100 through the management system network N3.

The storage section 24 is a functional section that holds therein the system information table group 220. The system information table group 220 includes an apparatus information table 221, a white communication table 222, a work information table 223, and a control information table 224. It is to be noted that details of the tables of the system information table group 220 are hereafter described.

The system information management section 22 is a functional section that performs accessing to the system information table group 220 held in the storage section 24.

The abnormal communication discrimination apparatus 100 evaluates the abnormal communication, which is detected by the system, from two points of view including an eventual point of view and a statistical point of view on the basis of the abnormal communication information received from the communication monitoring apparatus 20. The abnormal communication discrimination apparatus 100 discriminates, on the basis of a result of the evaluation, whether the abnormal communication is caused by a cyber-attack or by a failure of an apparatus of the system, generates the discrimination result information including the result of the discrimination, and transmits the generated information to the manager terminal 60.

Figure 3:
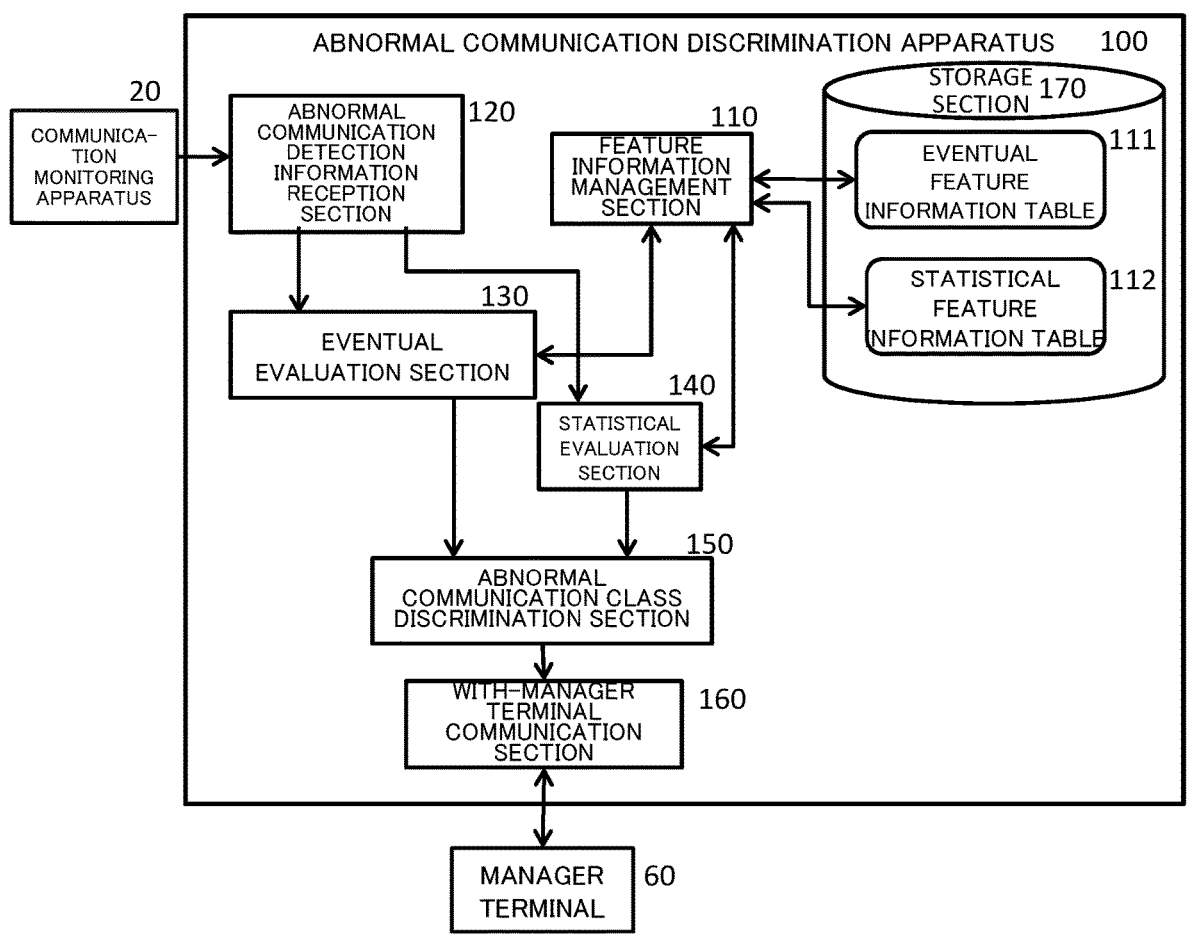
FIG. 3 is a functional block diagram of an abnormal communication discrimination apparatus.

Referring to FIG. 3, the abnormal communication discrimination apparatus 100 includes, as the functional configuration, an abnormal communication detection information reception section 120, an eventual evaluation section 130, a statistical evaluation section 140, an abnormal communication class discrimination section 150, a with-manager terminal communication section 160, a feature information management section 110, and a storage section 170.

The abnormal communication detection information reception section 120 receives the abnormal communication detection information detected by the communication monitoring apparatus 20, through the management system network N3.

The eventual evaluation section 130 refers to an eventual feature information table 111 using the function of the feature information management section 110 to evaluate, from the number of coincident eventual features among eventual features in the cyber-attack linked to the detection event and eventual features of failures, whether the abnormal communication is caused by a cyber-attack or by a failure of an apparatus of the system (detailed logic is hereinafter described).

The statistical evaluation section 140 refers to a statistical feature information table 112 using the function of the feature information management section 110 to evaluate, from the number of coincident statistical features among statistical features in cyber-attacks linked to the detection event and statistical features of failures, whether the abnormal communication is caused by a cyber-attack or by a failure of an apparatus of the system (detailed logic is hereinafter described).

The abnormal communication class discrimination section 150 discriminates, on the basis of the evaluation results of the eventual evaluation section 130 and the statistical evaluation section 140, a cause of the abnormal communication in regard to whether the abnormal communication is caused by a cyber-attack or by a failure of an apparatus of the system (detailed logic is hereinafter described).

The with-manager terminal communication section 160 generates discrimination result information including the discrimination result of the abnormal communication class discrimination section 150 and the abnormal communication detection event information, and transmits the generated discrimination result information to the manager terminal 60.

The storage section 170 is a functional section that holds therein the eventual feature information table 111 and the statistical feature information table 112.

The feature information management section 110 is a functional section for accessing the eventual feature information table 111 and the statistical feature information table 112 held in the storage section 170.

Figure 4:
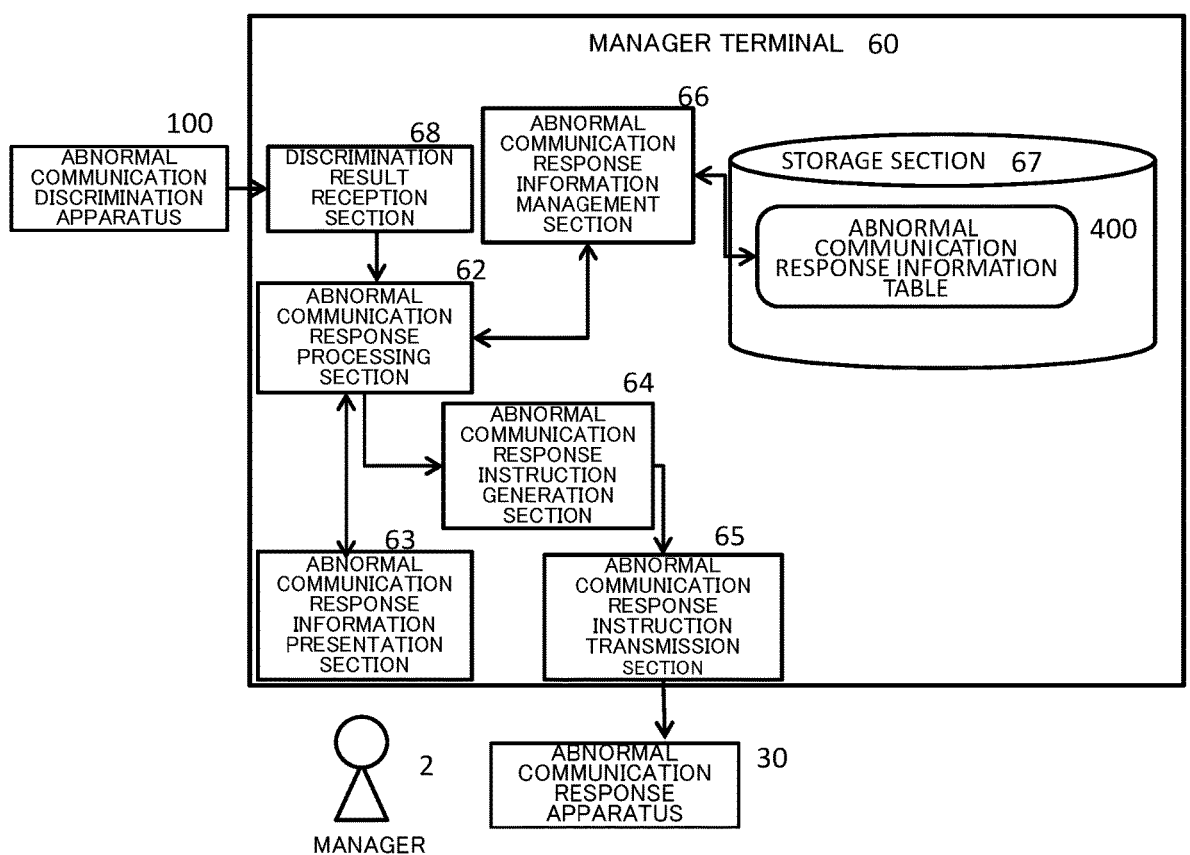
FIG. 4 is a functional block diagram of a manager terminal.

The manager terminal 60 is a terminal that receives information relating to abnormal communication and presents the receives information to the manager 2 such that a plan for response to the abnormal communication is selected by the manager 2. Referring to FIG. 4, the manager terminal 60 includes, as the functional sections thereof, a discrimination result reception section 68, an abnormal communication response processing section 62, an abnormal communication response information presentation section 63, an abnormal communication response instruction generation section 64, an abnormal communication response instruction transmission section 65, an abnormal communication response information management section 66, and a storage section 67.

The discrimination result reception section 68 receives the discrimination result of the abnormal communication from the abnormal communication discrimination apparatus 100 through the management system network N3.

The abnormal communication response processing section 62 extracts abnormal communication response information from an abnormal communication response information table 400 and transmits the abnormal communication response information to the abnormal communication response information presentation section 63, and transmits information regarding a plan for response to the abnormal communication selected by the manager 2 to the abnormal communication response instruction generation section 64.

The abnormal communication response information presentation section 63 presents the abnormal communication response information to the manager 2, and transmits information relating to the plan for response to the abnormal communication selected by the manager 2 to the abnormal communication response instruction generation section 64. It is to be noted that a user interface that allows the manager 2 to select a plan for response to the abnormal communication by causing the manager terminal to present the abnormal communication response information to the manager 2 is hereinafter described.

The abnormal communication response instruction generation section 64 generates an abnormal communication response instruction on the basis of the information regarding the plan for response to the abnormal communication sent thereto from the abnormal communication response processing section 62, and transmits the abnormal communication response instruction to the abnormal communication response instruction transmission section 65.

The abnormal communication response instruction transmission section 65 transmits the abnormal communication response instruction received from the abnormal communication response instruction generation section 64 to the abnormal communication response apparatus 30, through the management system network N3. The storage section 67 is a functional section that holds therein the abnormal communication response information table 400.

The abnormal communication response information management section 66 is a functional section that accesses the abnormal communication response information table 400 held in the storage section 67.

The abnormal communication response apparatus 30 receives the information relating to response to the abnormal communication from the manager terminal 60 through the management system network N3 and transmits, on the basis of the received information relating to the response to the abnormal communication, a control command or a control logic program to the apparatus (the controller 61, the actuator 71, and the sensor 72) of the monitoring target system 5 for which the abnormal communication response apparatus 30 has the processing authority. It is to be noted that the control logic program is control process software for a sequence for a controller implemented, for example, by execution of a predetermined process or arithmetic operation.

Figure 5:
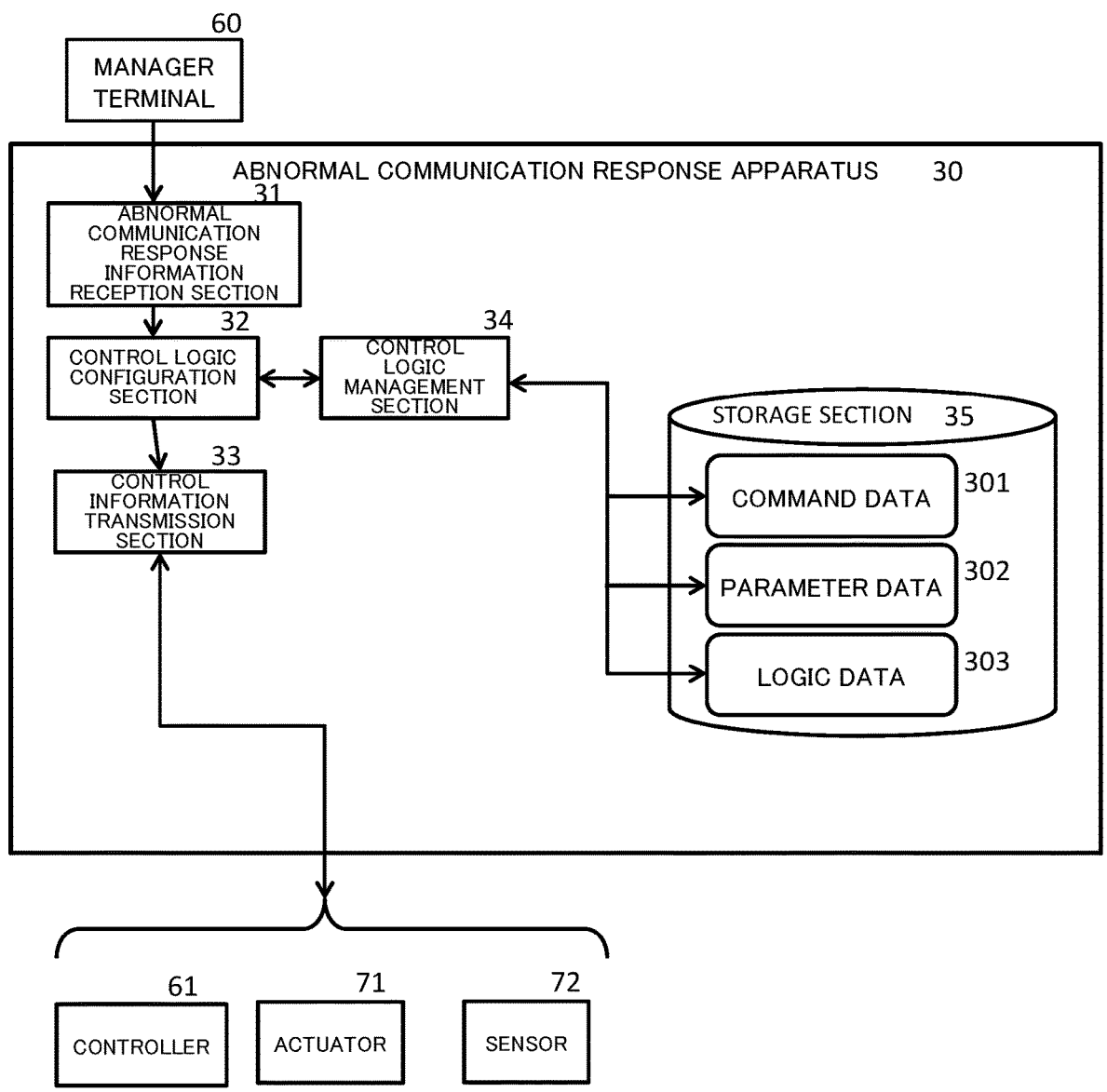
FIG. 5 is a functional block diagram of an abnormal communication response apparatus.

Referring to FIG. 5, the abnormal communication response apparatus 30 includes, as the functional configuration, an abnormal communication response information reception section 31, a control logic configuration section 32, a control information transmission section 33, a control logic management section 34, and a storage section 35.

The abnormal communication response information reception section 31 receives information relating to the response to the abnormal communication from the manager terminal 60 through the management system network N3, and transmits the received information to the control logic configuration section 32.

The control logic configuration section 32 refers to command data 301, parameter data 302, and logic data 303, which are retained in the storage section 35, through the control logic management section 34 to generate control information such as a control command or a control logic program to be transmitted to the apparatus of the monitoring target system 5 corresponding to the information relating to the response to the abnormal communication, and transmits the generated control information to the control information transmission section 33. The logic data 303 is data that describes an algorithm for control of the order of issuance of control commands and so forth.

The control information transmission section 33 transmits the control information such as the control command or the control logic program generated by the control logic configuration section 32 to an apparatus of the monitoring target system 5 such that it executes the control process.

Thereafter, the control information transmission section 33 receives return information of a result of execution of the control process from the applicable apparatus of the monitoring target system 5, and transmits the return information to the abnormal communication response information reception section 31. The control logic management section 34 is a functional section that accesses the command data 301, the parameter data 302, and the logic data 303 which are retained in the storage section 35.

The storage section 35 retains therein the command data 301, the parameter data 302, and the logic data 303 for configuring the control logic program and the control command to which the individual apparatus of the monitoring target system 5 corresponds.

It is to be noted that a particular example of the control command to be transmitted to the apparatus of the monitoring target system 5 is hereinafter described.

Now, a hardware-software configuration of the components of the apparatus that configure the abnormal communication response system is described with reference to FIGS. 6A to 6D.

Referring first to FIG. 6A, the communication monitoring apparatus 20 is configured such that, as a hardware configuration thereof, a processor 201, a main memory 202, a network I/F 203, an auxiliary storage I/F 204, and an auxiliary storage device 210 are connected to each other by an internal communication line such as a bus.

The processor 201 is, for example, a semiconductor device called as a central processing unit (CPU) or a micro processing unit (MPU), and executes various programs loaded from the auxiliary storage device 210 into the main memory 202 to implement various functions of the apparatus to control the overall apparatus. The main memory 202 is a semiconductor device that stores programs and work data and is, for example, a read-only memory (ROM) that is a nonvolatile storage element and a random access memory (RAM) that is a volatile storage element. Here, the ROM retains therein immutable programs (a basic input/output system (BIOS), firmware, and so forth), and the RAM is a high-speed volatile storage element such as a dynamic random access memory (DRAM), and temporarily retains therein a program to be executed and data to be used by the processor 201 at the time of execution of the program.

The network I/F 203 is an interface circuit that connects to a network, and collects communication packets of the apparatus of the monitoring target system 5 connected to the first network N1 and the second network N2 from the network switch 40 and performs transmission and reception of communication packets to and from the apparatus connected to the management system network N3 in accordance with a predetermined protocol.

The auxiliary storage device 210 is a device that retains therein programs to be executed by the processor 201 and data to be used by the processor 201 at the time of execution of the programs, and is a nonvolatile storage device such as a magnetic storage device (hard disk drive: HDD) or a flash memory (solid stage drive: SSD).

In the auxiliary storage device 210, an abnormal communication detection program 211, a system information management program 212, and an abnormal communication detection information transmission program 213 are installed.

The abnormal communication detection program 211, the system information management program 212, and the abnormal communication detection information transmission program 213 are programs for implementing the functions of the abnormal communication detection section 21, the system information management section 22, and the abnormal communication detection information transmission section 23, respectively.

Further, the auxiliary storage device 210 has the system information table group 220 stored therein.

Although the foregoing description is directed to an example of the communication monitoring apparatus 20 in which an information processing apparatus for universal use implements the various functions with software, the communication monitoring apparatus 20 may otherwise be an apparatus for exclusive use implemented by a field-programmable gate array (FPGA) or an application specific integrated circuit (ASIC).

Also the hardware configuration of the abnormal communication response apparatus 30 is similar to that of the communication monitoring apparatus 20 described above as depicted in FIG. 6B. Also the abnormal communication response apparatus 30 may be an information processing apparatus for universal use whose functions are implemented by software, or may be implemented by an apparatus for exclusive use.

In an auxiliary storage device 310 of the abnormal communication response apparatus 30, an abnormal communication response information reception program 311, a control logic configuration program 312, a control information transmission program 313, and a control logic management program 314 are installed.

The abnormal communication response information reception program 311, the control logic configuration program 312, the control information transmission program 313, and the control logic management program 314 are programs that implement the functions of the abnormal communication response information reception section 31, the control logic configuration section 32, the control information transmission section 33, and the control logic management section 34, respectively.

The auxiliary storage device 310 of the abnormal communication response apparatus 30 has the command data 301, the parameter data 302, and the logic data 303 stored therein.

Also the hardware configuration of the abnormal communication discrimination apparatus 100 is similar to that of the communication monitoring apparatus 20 described hereinabove as depicted in FIG. 6C. Also in the abnormal communication discrimination apparatus 100, the functions may be implemented with software by an information processing apparatus for universal use or may otherwise be implemented by an apparatus for exclusive use.

In an auxiliary storage device 1010 of the abnormal communication discrimination apparatus 100, a feature information management program 1011, an abnormal communication information reception program 1012, an eventual evaluation program 1013, a statistical evaluation program 1014, an abnormal communication class discrimination program 1015, and a with-manager terminal communication program 1016 are installed.

The feature information management program 1011, the abnormal communication information reception program 1012, the eventual evaluation program 1013, the statistical evaluation program 1014, the abnormal communication class discrimination program 1015, and the with-manager terminal communication program 1016 are programs that implement the functions of the feature information management section 110, the abnormal communication detection information reception section 120, the eventual evaluation section 130, the statistical evaluation section 140, the abnormal communication class discrimination section 150, and the with-manager terminal communication section 160, respectively.

In the auxiliary storage device 1010 of the abnormal communication discrimination apparatus 100, the eventual feature information table 111 and the statistical feature information table 112 are stored.

Figure 6D:
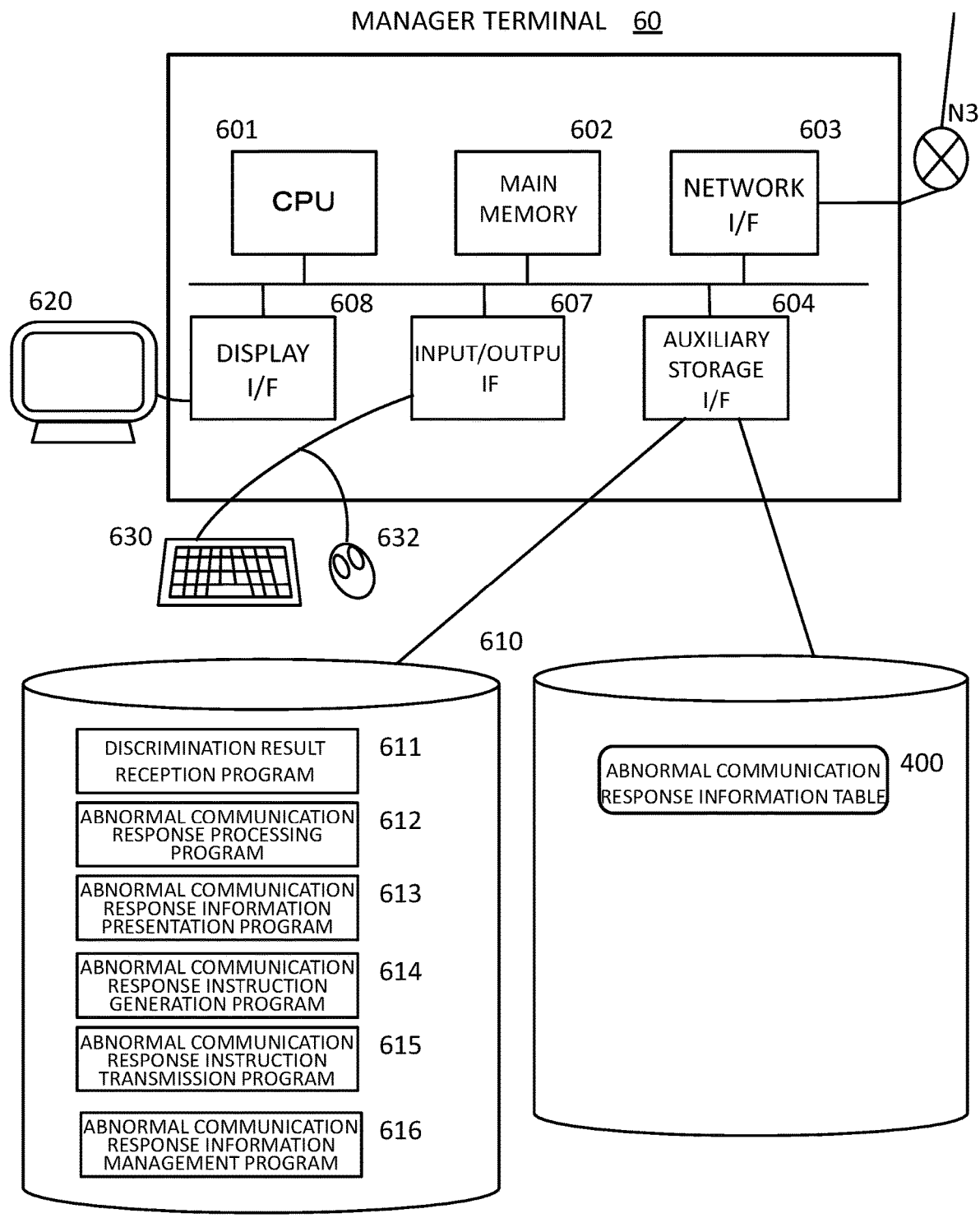
FIG. 6D is a hardware-software block diagram of the abnormal communication discrimination apparatus.
Figure 16:
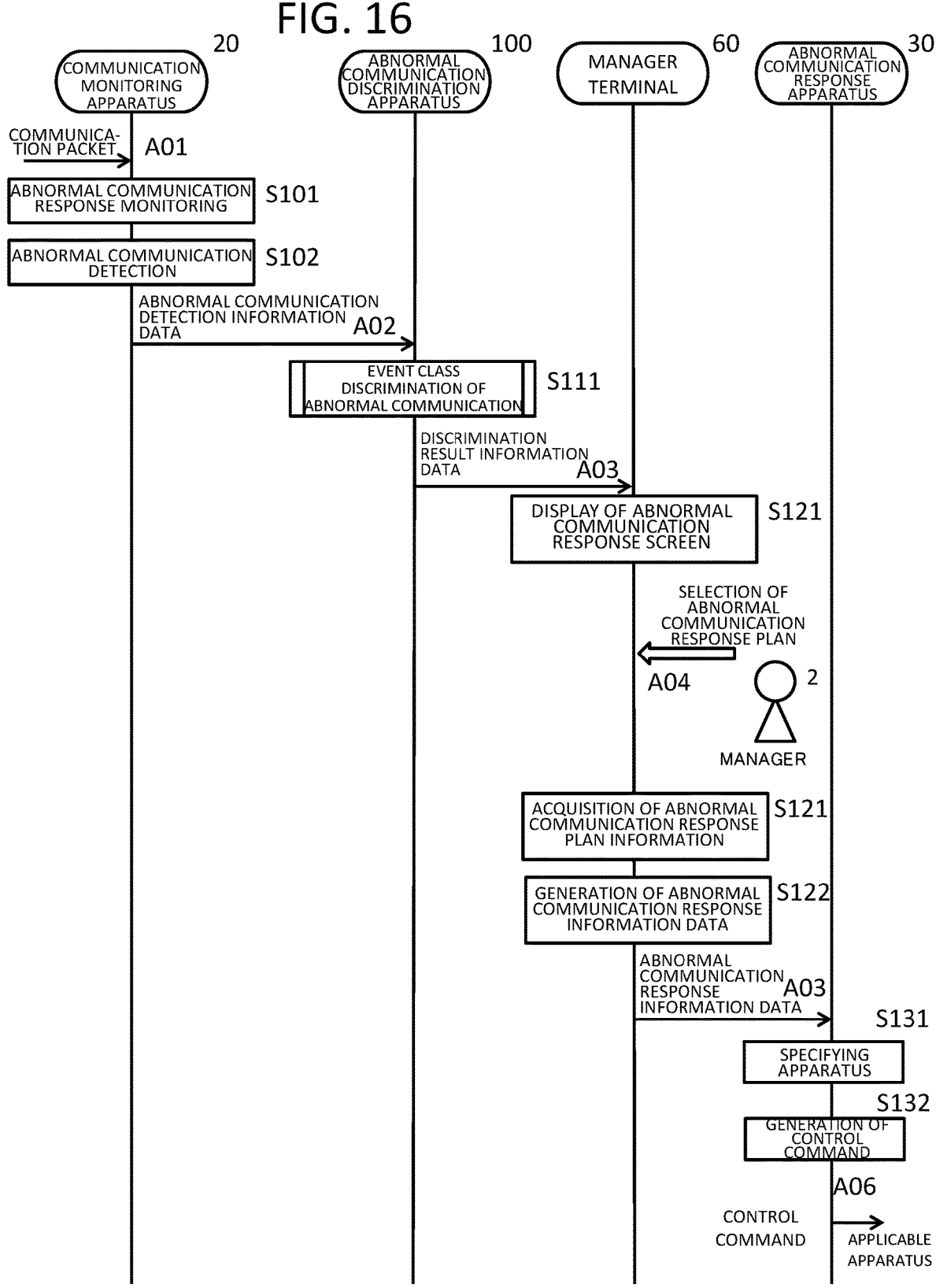
FIG. 16 is a sequence diagram depicting processing of the abnormal communication response system.

The hardware configuration of the manager terminal 60 can be implemented by the same hardware configuration as the communication monitoring apparatus 20 described hereinabove such as a general PC, a work station, or a tablet as depicted in FIG. 6D.

In an auxiliary storage device 610 of the manager terminal 60, a discrimination result reception program 611, an abnormal communication response processing program 612, an abnormal communication response information presentation program 613, an abnormal communication response instruction generation program 614, an abnormal communication response instruction transmission program 615, and an abnormal communication response information management program 616 are installed.

The discrimination result reception program 611, the abnormal communication response processing program 612, the abnormal communication response information presentation program 613, the abnormal communication response instruction generation program 614, the abnormal communication response instruction transmission program 615, and the abnormal communication response information management program 616 are programs that implement the functions of the discrimination result reception section 68, the abnormal communication response processing section 62, the abnormal communication response information presentation section 63, the abnormal communication response instruction generation section 64, the abnormal communication response instruction transmission section 65, and the abnormal communication response information management section 66, respectively.

Further, the auxiliary storage device 610 of the manager terminal 60 has the abnormal communication response information table 400 stored therein.

The manager terminal 60 further includes a display I/F 606 and an input/output I/F 607.

The display I/F 606 is an interface for connecting a display device 620 such as a liquid crystal display (LCD).

The input/output I/F 607 is an interface for connecting inputting and outputting devices. To the input/output I/F 607, a keyboard 630, a mouse 632 of a pointing device, and so forth are connected.

Now, a data structure used in the abnormal communication response system is described with reference to FIGS. 7 to 15.

The system information table group 220 is a group of tables retained by the communication monitoring apparatus 20 and is used to decide whether or not communication has some abnormality. The system information table group 220 includes the apparatus information table 221, the white communication table 222, the work information table 223, and the control information table 224.

The apparatus information table 221 is a table that retains information relating to the apparatus in the monitoring target system 5 and has fields for an apparatus ID $221a$, an apparatus name $221b$, an IP address $221c$, an alternative apparatus ID $221d$, a model information $221e$, an apparatus specification information $221f$, an execution environment requirement information $221g$, and a work ID $221h$ as depicted in FIG. 7.

In the apparatus ID 221a, an identifier for uniquely identifying the apparatus is placed. In the apparatus name 221b, an apparatus name is placed. In the IP address 221c, an IP address applied to the apparatus is placed. In the alternative apparatus ID 221d, an identifier of an alternative apparatus that replaces, in a case where the apparatus has some abnormality, the apparatus and takes over the work of the apparatus is placed. In the model information 221e, a model (model No.) of the apparatus applied by its manufacturing enterprise is placed. In the apparatus specification information 221f, information relating to specifications of the apparatus (for example, in a case of the controller 61, a memory capacity, an operation clock, and so forth; in a case of the actuator 71, an operation speed and so forth; in a case of the sensor 72, a measurement range, a measurability, and so forth) is placed. In the execution environment requirement information 221g, information relating to an environment in which the apparatus is used (for example, an operating voltage, a temperature for normal operation, and so forth) is placed. In the work ID 221h, a work identifier of a work that the apparatus takes charge is placed.

The white communication table 222 is a table for retaining communication information for performing white list communication in regard to communication in the monitoring target system 5, and has fields for a white communication ID 222a, a communication protocol 222b, a transmission source IP address 222c, a destination IP address 222d, a transmission source port number 222e, and a destination port number 222f as depicted in FIG. 8. Here, the white list communication is a way of communication by which only the permitted communication is permitted to be performed or a way of communication performed so as to moderate an abnormality decision regarding communication.

In the white communication ID 222a, an ID uniquely representing white communication is placed. In the communication protocol 222b, an identifier or a name representative of a protocol of communication ("TCP/IP" or the like) is placed. In the transmission source IP address 222c and the destination IP address 222d, IP addresses of a transmission source and a destination of a communication packet are placed. In the transmission source port number 222e and the destination port number 222f, port numbers of the transmission source and the destination of a communication packet are placed, respectively.

The work information table 223 is a table for retaining information relating to a work performed in the monitoring target system 5, and has fields for a work ID 223a, a work name 223b, operation time 223c, a priority rank 223d, and a communication ID list 223e as depicted in FIG. 9.

In the work ID 223a, an identifier for uniquely identifying the work is placed. In the work name 223b, a name of the work is placed. In the operation time 223c, information about operation time indicative of a time zone within which the work is executed. In the priority rank 223d, information representative of a priority rank of the work is placed in the form of a number or the like. In the communication ID list 223e, a list of communication IDs that take charge of the work is placed.

The control information table 224 is a table for retaining control information of an apparatus used in the work. As depicted in FIG. 10, the control information table 224 has fields for a communication ID 224a, a control protocol 224b, a control command 224c, a control parameter 224d, and a communication cycle 224e.

In the communication ID 224a, an ID uniquely representing communication with an apparatus is placed. In the control protocol 224b, an identifier or a name representative of a protocol relating to communication for control is placed. In the control command 224c, information relating to a control command to be provided to the apparatus of the monitoring target system 5 (command name, command identifier, or the like) is placed. In the control parameter 224d, information of a parameter of the control command is placed. In the communication cycle 224e, a cycle in which a communication packet for control is to be transmitted or received is placed.

The control command 80 is a command for controlling the apparatus of the monitoring target system 5 and is, in the present embodiment, information that is provided, in order to response to abnormal communication, from the abnormal communication response apparatus 30 to the apparatus of the monitoring target system 5 and is placed in the payload of a communication packet.

Referring to FIG. 11, the control command 80 has fields, for example, for a control protocol 80a, a control command 80b, and a control parameter 80c.

Examples in FIG. 11 in which the control protocol 80a is "Modbus/TCP" intend a command for controlling the controllers 61 such as a PLC; and another example in which the control protocol 80a is "MQTT" intends a command for the PLC and the like controlling the actuators 71 and the sensors 72.

The eventual feature information table 111 is a table for retaining information to be used when the abnormal communication discrimination apparatus 100 evaluates abnormal communication from an eventual feature (details are hereinafter described). As depicted in FIG. 12, the eventual feature information table 111 includes fields for an abnormal communication detection event ID 111a, and an abnormal communication detection event 111b, a discrimination event 111c, and a discrimination event class 111d.

In the abnormal communication detection event ID 111a, an identifier for uniquely identifying an abnormal communication detection event is placed. In the abnormal communication detection event 111b, a text for explaining the abnormal communication detection event is placed. In the discrimination event 111c, a text for explaining an event of an attack, a failure, or the like that is highly likely occurring in the monitoring target system is placed. In the discrimination event class 111d, a flag indicative of whether the abnormal communication is caused by a cyber-attack or by a failure of an apparatus is placed.

The texts of the abnormal communication detection event 111b and the discrimination event 111c can be used so as to be displayed as contents of an abnormal communication response screen (hereinafter described in detail) of the manager terminal 60 to be indicated to the manager 2.

The statistical feature information table 112 is a table for retaining therein information to be used when the abnormal communication discrimination apparatus 100 evaluates abnormal communication from features of statistical amounts (details are hereinafter described). Referring to FIG. 13, the statistical feature information table 112 has fields for a statistical feature ID 112a, a statistical feature 112b, a discrimination condition 112c, a conditional expression 112d, and a discrimination event class 112e.

In the statistical feature ID 112a, an identifier for uniquely identifying a statistical feature is placed. In the statistical feature 112b, a text for explaining the statistical feature is placed. In the discrimination condition 112c, a discrimination condition used for statistically analyzing the received detection information and discriminating, from the statistical amount of the communication abnormality, with which statistical feature the abnormal communication coincides is placed. In the conditional expression 112d, a discriminant built up from the condition indicated by the discrimination condition 112c is placed. In the discrimination event class 112e, a flag indicative of whether the abnormal communication is caused by a cyber-attack or by a failure of an apparatus is placed.

Here, in a record whose statistical feature ID 112a is "SP1," since the number of generation sources of abnormal communication of the same type per unit time is within a range of a predetermined threshold value and the number of occurrences of the same type abnormal communication per unit time is smaller than a predetermined threshold value, it is discriminated that the abnormal communication is caused not by a cyber-attack but by a failure of an apparatus.

Discrimination result information data 500 is data to be transmitted from the abnormal communication discrimination apparatus 100 to the manager terminal 60, and includes abnormal communication detection event information 500a and discrimination information 500b as depicted in FIG. 14.

The abnormal communication detection event information 500a includes such information about an abnormal communication detection event, information about abnormal communication, and apparatus information as depicted in FIG. 14, and the discrimination information 500b includes an eventual feature evaluation result, a statistical feature evaluation result, and discrimination result information.

The abnormal communication response information table 400 is a table for retaining therein information about an abnormal communication detection event and information about a response plan based on the event class of the abnormal communication discriminated by the abnormal communication discrimination apparatus. Referring to FIG. 15, the abnormal communication response information table 400 has fields for a response information ID 400a, an abnormal communication detection event 400b, an event class 400c, and a response plan 400d.

In the response information ID 400a, an identifier for uniquely identifying abnormal communication response information is placed. In the abnormal communication detection event 400b, a text for explaining the abnormal communication detection event is placed. In the event class 400c, a flag indicative of whether the abnormal communication discriminated by the abnormal communication discrimination apparatus is caused by a cyber-attack or by a failure of an apparatus is placed. In the response plan 400d, a text indicative of a response plan that the management system is to take for the abnormal communication detection event 400b and the event class 400c is placed.

Processing of the abnormal communication response system is described with reference to FIGS. 12, 13, 16, and 17 described hereinabove.

First, the communication monitoring apparatus 20 receives communication packets of the first network N1 and the second network N2 from the network switch 40 and monitors them in terms of abnormal communication (A01 and S101). Then, if abnormal communication is detected (S102), then the communication monitoring apparatus 20 transmits abnormal communication detection information data of the abnormal communication to the abnormal communication discrimination apparatus 100 (A02).

Then, the abnormal communication discrimination apparatus 100 performs an event class discrimination process of the abnormal communication on the basis of the received abnormal communication detection information data (S111), and transmits discrimination result information data (hereinafter described in detail) including the abnormal communication detection information and the event class discrimination result information to the manager terminal 60 (A03).

It is to be noted that details of the event class discrimination process of the abnormal communication are hereinafter described.

Then, the manager terminal 60 edits the data of the abnormal communication detection information and the event class discrimination result information on the basis of the discrimination result information data received from the abnormal communication discrimination apparatus 100 and the abnormal communication response information table 400, and displays an abnormal communication response screen (a particular example of which is hereinafter described) on the display device 620 (S121), thereby to present the data to the manager 2.

If the manager 2 selects a response plan for the abnormal communication displayed on the abnormal communication response screen (A04), then the manager terminal 60 acquires information on the response plan for the abnormal communication (S122), generates abnormal communication response information data in accordance with the information on the response plan for the abnormal communication (S123), and transmits the abnormal communication response information data including the abnormal communication detection information and the response plan to the abnormal communication response apparatus 30 (A05).

The abnormal communication response apparatus 30 specifies an applicable apparatus of the monitoring target system 5 on the basis of the abnormal communication response information data transmitted thereto (S131), generates a control command to be transmitted (S132), and transmits the control command to the applicable apparatus of the monitoring target system 5 (A06).

Figure 17:
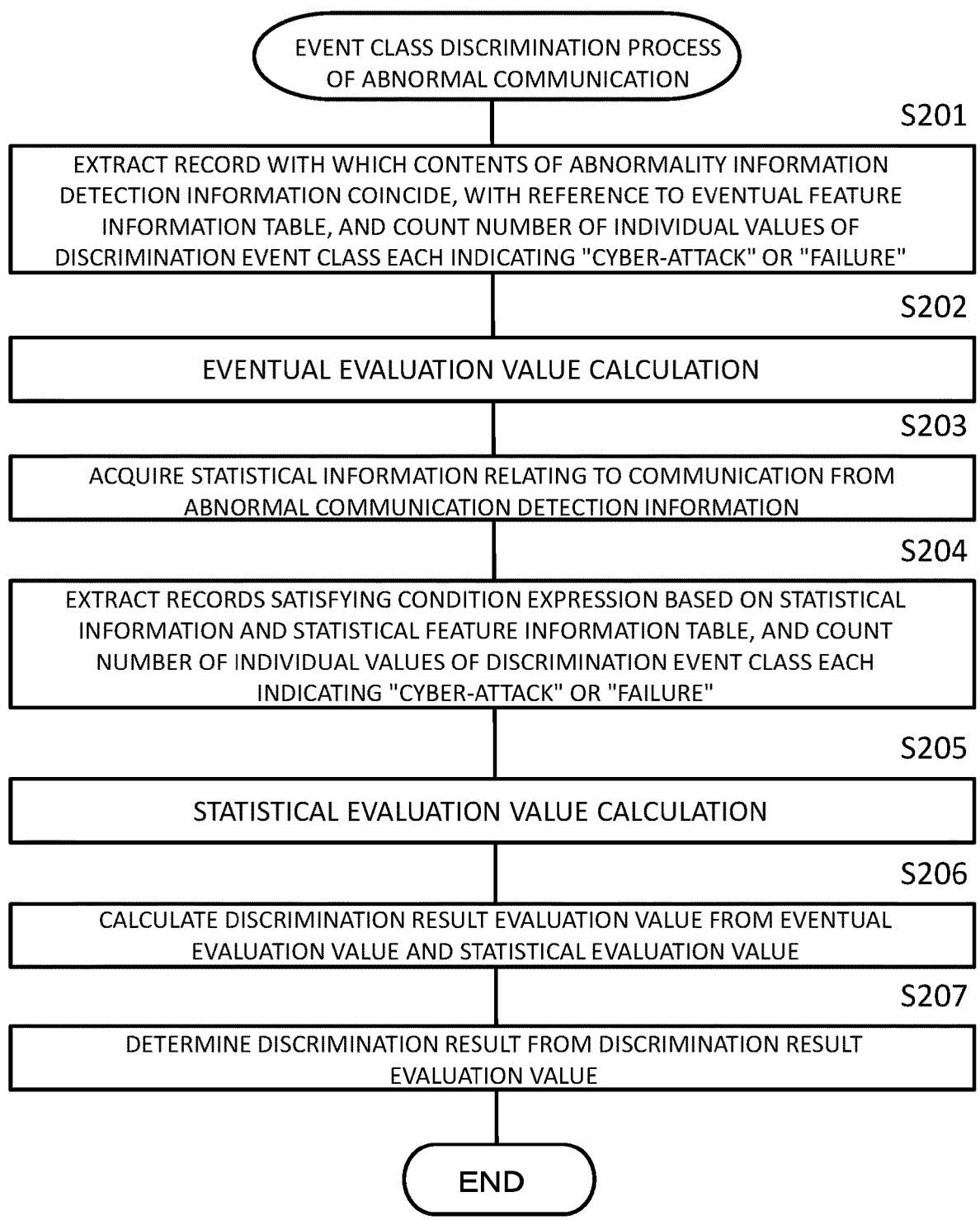
FIG. 17 is a flow chart depicting details of an event class discrimination process of abnormal communication.

Now, details of the event class discrimination process for abnormal communication are described with reference to FIG. 17.

First, the eventual evaluation section 130 of the abnormal communication discrimination apparatus 100 refers to the eventual feature information table 111 to extract records of the eventual feature information table 111 of the abnormal communication detection event 111b with which contents of the received abnormality information detection information coincide, acquires the value of the discrimination event class 111d of the records, and counts the numbers of the values each of which indicates a "cyber-attack" or a "failure" (S201).

Then, the eventual evaluation section 130 calculates the eventual evaluation value EventEval of the abnormal communication in accordance with the following (Expression 1) (S202):

$$EventEval = e_c \times EC + e_f \times EF \quad \text{(Expression 1)}$$

where EC is the number of the acquired records in which the value of the discrimination event class 111d indicates "cyber-attack"; EF is the number of the acquired records in which the value of the discrimination event class 111d indicates "failure"; and $e_c$ and $e_f$ are optimization factors for evaluation.

The optimization factors for evaluation are determined so as to satisfy $e_c > e_f$ (for example, $e_c=1$ and $e_f=-1$). The optimization factors for evaluation may be determined by applying weighting in accordance with knowhow of a system engineer, a situation of the apparatus of the system, or the like. For example, in a case where increased cyber-attacks occur on a specific date, $e_c$ may be increased, or when the number of years of apparatus use exceeds a service life of a predetermined period, $e_f$ may be increased.

In a case where $e_c$ and $e_f$ are set to $e_c=1$ and $e_f=-1$, respectively, if the eventual evaluation value EventEval indicates a positive value, then this indicates that the possibility of a cyber-attack is high, and signifies that, as the value increases, the possibility of a cyber-attack increases. In contrast, in the case where $e_c$ and $e_f$ are set to $e_c=1$ and $e_f=-1$, respectively, if the eventual evaluation value EventEval indicates a negative value, then this indicates that the possibility of a failure is high, and signifies that, as the value decreases, the possibility of a failure increases. In the case where $e_c$ and $e_f$ are set to $e_c=1$ and $e_f=-1$, respectively, a negative value of the eventual evaluation value EventEval indicates that it is difficult to discriminate whether the abnormal communication is caused by a cyber-attack or by a failure of an apparatus.

Then, the statistical evaluation section 140 of the abnormal communication discrimination apparatus 100 acquires statistical information relating to communication from within the received abnormal communication detection information (S203). The statistical information relating to communication includes various statistical amounts of the abnormal communication, namely, an increase amount of abnormal communication per unit time, an increase amount of abnormal communication per unit time in specific communication, the number of generation sources of abnormal communication of the same type per unit time, the number of occurrences of abnormal communication of the same type per unit time, and so forth.

Then, the statistical evaluation section 140 of the abnormal communication discrimination apparatus 100 acquires records in which the statistical information calculated in S203 satisfies the contents of the discrimination condition 112c and the conditional expression 112d retained in the statistical feature information table 112, acquires the value of the discrimination event class 112e in the records, and counts the number of the values for each of the "cyber-attack" and the "failure" (S204).

Then, the statistical evaluation section 140 calculates a statistical evaluation value StatEval of the abnormal communication in accordance with "Expression 2" given below (S205):

$$StatEval = s_c \times SC + s_f \times SF \qquad \text{(Expression 2)}$$

where SC is the number of the acquired records in which the value of the discrimination event class 112e indicates "cyber-attack"; SF is the number of the acquired records in which the value of the discrimination event class 112e indicates "failure"; and $s_c$ and $s_f$ are optimization factors for evaluation.

The optimization factors for evaluation are determined so as to satisfy $s_c > s_f$ (for example, $s_c=1$ and $s_f=-1$). The optimization factors for evaluation may be determined similarly by applying weighting in accordance with knowhow of the system engineer, a situation of the apparatus of the system, or the like.

The optimization factors for evaluation, the possibility of a cyber-attack, and the possibility of a failure of an apparatus are similar to those described hereinabove in connection with the eventual evaluation value.

Then, the abnormal communication class discrimination section 150 of the abnormal communication discrimination apparatus 100 calculates a discrimination result evaluation value Eval in accordance with the (Expression 3) given below on the basis of the eventual evaluation value EventEval calculated in S202 and the statistical evaluation value StatEval calculated in S205 (S206):

$$Eval = k_E + EventEval + k_S \times StatEval \qquad \text{(Expression 3)}$$

where $k_E$ and $k_S$ are weighting factors for evaluation of the eventual evaluation and the statistical evaluation, respectively.

The values of the weighting factors $k_E$ and $k_S$ for evaluation are coefficients indicative of importance degrees of the eventual evaluation and the statistical evaluation, respectively. In a case where they are equal to each other, they are set to $k_E=1$ and $k_S=1$. Further, they can be determined by the manager 2 depending upon to which one of the eventual evaluation and the statistical evaluation importance is to be attached.

However, the optimization factors $e_c$ and $e_f$ for eventual evaluation, optimization factors $s_c$ and $s_f$ for statistical evaluation, and weighting coefficients $k_E$ and $k_S$ for a final discrimination result may be determined by learning with learning data.

Then, the abnormal communication class discrimination section 150 of the abnormal communication discrimination apparatus 100 calculates a discrimination result evaluation Result in accordance with the (Expression 4) given below in such a manner as described below on the basis of the discrimination result evaluation value Eval calculated in S206. The discrimination result evaluation is represented in the form of a text of an evaluation of the abnormal communication on the basis of the discrimination result evaluation value Eval.

The discrimination result evaluation value Eval indicates that, as the value thereof increases, the abnormal communication is caused by a cyber-attack with an increasing possibility and is not caused by a failure of an apparatus with a decreasing possibility, depending upon the manner how to take the optimization coefficients $e_c$ and $e_f$ in regard to the eventual evaluation value EventEval, optimization coefficients $s_c$ and $s_f$ in regard to the statistical evaluation value StatEval, and the weighting coefficients $k_E$ and $k_S$ in regard to the discrimination result evaluation value Eval.

Accordingly, where five-stage evaluation is applied, four threshold values $Th_1$, $Th_2$, $Th_3$, and $Th_4$ are applied and set so as to satisfy $Th_1 > Th_2 > Th_3 > Th_4$. Then, the five-stage evaluation is made in the following manner:

when $Eval \geq Th_1$, Result="cyber-attack";
when $Th_2 \geq Eval > Th_1$, Result="possibility of cyber-attack";
when $Th_3 \geq Eval > Th_2$, Result="cyber-attack/failure";
when $Th_4 \geq Eval > Th_3$, Result="possibility of failure"; and
when $Eval > Th_4$, Result="failure"

Now, an abnormal communication response screen displayed by the manager terminal is described with reference to FIG. 18.

Figure 18:
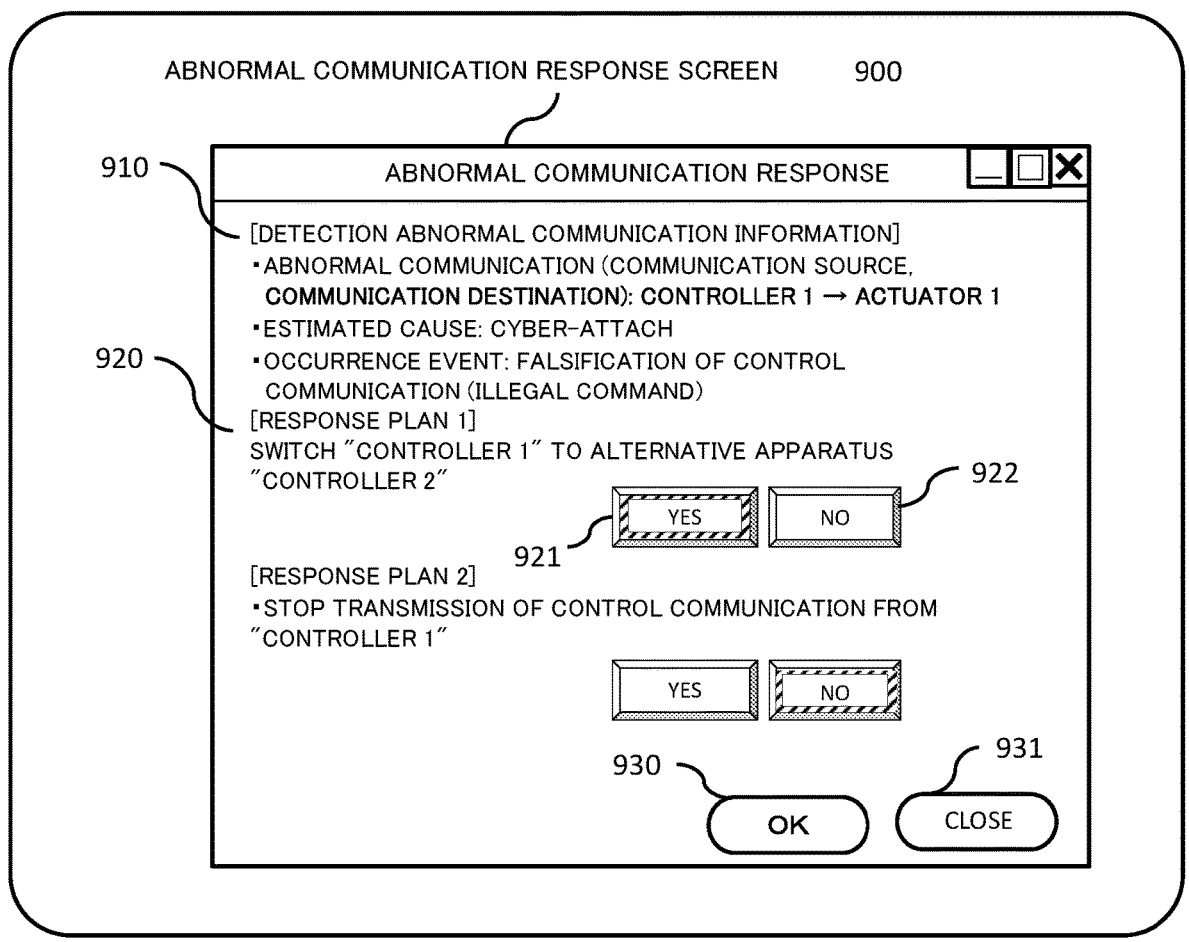
FIG. 18 is a view depicting an example of an abnormal communication response screen displayed by the manager terminal.

FIG. 18 is a view depicting an example of the abnormal communication response screen displayed by the manager terminal.

The abnormal communication response screen 900 is a screen to be displayed by the manager terminal 60 in order to allow the manager to select a response plan for abnormal communication on the basis of abnormal communication detection information detected by the communication monitoring apparatus 20 and a result of discrimination, discriminated by the abnormal communication discrimination apparatus 100, whether the abnormal communication is caused by a cyber-attack or by a failure of an apparatus.

As depicted in FIG. 18, on the abnormal communication response screen 900, a detection abnormal communication information displaying field 910, and a response plan selection field 920 are displayed such that, after the contents of the response plan 400d of the abnormal communication response information table 400 are edited, and a single or a plurality of response plans are displayed like ' [Response plan 1] To switch "controller 1" to alternative apparatus "controller 2".' In the response plan selection field 920, a yes button 921 for permitting carrying out of selection of each response plan and a no button 922 for inhibiting carrying out of selection of each response plan are displayed. The yes button 921 and the no button 922 are exclusive toggle buttons.

When the manager 2 selects the response plan, the manager 2 clicks the yes button 921 to select the response plan, but when the manager 2 does not select the response plan, the manager 2 clicks the no button 922. Then, the manager 2 finally clicks an OK button 930. On the other hand, when the manager 2 cancels the inputted contents, the manager 2 clicks a cancel button 931.

In the abnormal communication response system according to the present embodiment described above, evaluation of a cause of abnormal communication detected in any apparatus of the system is performed from the numbers of coincident ones of features of cyber-attacks and features of failures on the basis of evaluation based on eventual features and statistical features. Further, a discrimination result value for the discrimination between a cyber-attack and a failure is obtained on the basis of the two evaluation values. This makes it possible to provide an abnormal communication discrimination apparatus capable of discriminating whether abnormal communication detected in a monitoring target system is caused by a cyber-attack or by an apparatus failure.

In this manner, since, when abnormal communication occurs, it is possible to discriminate a cyber-attack and a failure from each other, it is possible to propose response plans suitable for the event, the manager can select an appropriate response plan, and the system can quickly perform the response plan suitable for the abnormal communication. Therefore, also an advantageous effect that damage by a cyber-attack or a failure can be suppressed to a low level can be anticipated.

What is claimed is:

1. An abnormal communication discrimination apparatus that discriminates a cause of abnormal communication detected in a monitoring target system in which an apparatus operates,
the abnormal communication discrimination apparatus further comprising:
a storage section for retaining therein
an eventual feature table that retains therein records each of which stores, for each abnormal communication detection event, a discrimination event class indicative of whether abnormal communication is caused by a cyber-attack or by a failure of the apparatus of the monitoring target system, and
a statistical feature table that retains therein records each of which stores, for each condition in which a statistical amount of abnormal communication holds, a discrimination event class indicative of whether abnormal communication is caused by a cyber-attack or by a failure of the apparatus of the monitoring target system,
receiving abnormal communication detection information from an abnormal communication detection information transmission section in the monitoring target system,
an eventual evaluation section, calculating, on a basis of the received abnormal communication detection information, an eventual evaluation value from each number of records to which the abnormal communication detection events of the eventual feature table are applicable and in which a value of the discrimination event class indicates whether abnormal communication is caused by a cyber-attack or by a failure of the apparatus of the monitoring target system,
a statistical evaluation section, calculating a statistical amount of abnormal communication from the received abnormal communication detection information, and
on a basis of the calculated statistical amount of abnormal communication, a statistical evaluation value from each number of records each of which satisfies a condition that a statistical amount of abnormal communication of the statistical feature table holds, the each number indicating whether abnormal communication is caused by a cyber-attack or by a failure of the apparatus of the monitoring target system, and
an abnormal communication class discrimination section, calculating, on a basis of the eventual evaluation value and the statistical evaluation value, a discrimination result evaluation value indicative of whether abnormal communication is caused by a cyber-attack or by a failure of the apparatus of the monitoring target system, and performing, on a basis of the discrimination result evaluation value, discrimination of whether abnormal communication is caused by a cyber-attack or by a failure of the apparatus of the monitoring target system.

2. The abnormal communication discrimination apparatus according to claim 1, wherein the eventual evaluation value is calculated by applying a weighted linear sum of the number of the records that indicate whether abnormal communication is caused by a cyber-attack or by a failure of the apparatus of the monitoring target system.

3. The abnormal communication discrimination apparatus according to claim 1, wherein the statistical evaluation value is calculated by applying a weighted linear sum of the number of the records that indicate whether abnormal communication is caused by a cyber-attack or by a failure of the apparatus of the monitoring target system.

4. The abnormal communication discrimination apparatus according to claim 1, wherein the discrimination result evaluation value is calculated by applying a weighted linear sum of the eventual evaluation value and the statistical evaluation value.

5. An abnormal communication discrimination method by an abnormal communication discrimination apparatus that discriminates a cause of abnormal communication detected in a monitoring target system in which an apparatus operates,
the abnormal communication discrimination apparatus retaining in a storage section therein an eventual feature table that retains therein records each of which stores, for each abnormal communication detection event, a discrimination event class indicative of whether abnormal communication is caused by a cyber-attack or by a failure of the apparatus of the monitoring target system, and a statistical feature table that retains therein records each of which stores, for each condition in which a statistical amount of abnormal communication holds, a discrimination event class indicative of whether abnormal communication is caused by a cyber-attack or by a failure of the apparatus of the monitoring target system,
the abnormal communication discrimination method, by the abnormal communication discrimination apparatus, comprising:
receiving by abnormal communication detection information reception section, abnormal communication detection information in the monitoring target system;
calculating, by an eventual evaluation section, on a basis of the received abnormal communication detection information, an eventual evaluation value from each number of records to which the abnormal communication detection events of the eventual feature table are applicable and in which a value of the discrimination event class indicates whether abnormal communication is caused by a cyber-attack or by a failure of the apparatus of the monitoring target system;
calculating, by a statistical evaluation section, a statistical amount of abnormal communication from the received abnormal communication detection information, and;
on a basis of the calculated statistical amount of abnormal communication, a statistical evaluation value from each number of records each of which satisfies a condition that a statistical amount of abnormal communication of the statistical feature table holds, the each number indicating whether abnormal communication is caused by a cyber-attack or by a failure of the apparatus of the monitoring target system; and
calculating, by an abnormal communication class discrimination section, on a basis of the eventual evaluation value and the statistical evaluation value, a discrimination result evaluation value indicative of whether abnormal communication is caused by a cyber-attack or by a failure of the apparatus of the monitoring target system, and performing, on a basis of the discrimination result evaluation value, discrimination of whether abnormal communication is caused by a cyber-attack or by a failure of the apparatus of the monitoring target system.

6. An abnormal communication response system that discriminates a cause of abnormal communication detected in a monitoring target system in which an apparatus operates, the abnormal communication response system comprising:
a communication monitoring apparatus comprising an abnormal communication detection section, a system information management section, and a storage section wherein the communication monitoring apparatus monitors the monitoring target system in regard to abnormal communication;
an abnormal communication response apparatus comprising a control information transmission section that transmits control information to the apparatus of the monitoring target system;
a manager terminal that displays network information of the monitoring target system thereon and accepts an instruction from a manager; and
an abnormal communication discrimination apparatus that evaluates abnormal communication detection information and discriminates, on a basis of a result of the evaluation, whether abnormal communication is caused by a cyber-attack or a failure of the apparatus, wherein the communication monitoring apparatus further comprising an abnormal communication detection information transmission section which transmits the abnormal communication detection information received from an abnormal communication detection section to the abnormal communication discrimination apparatus,
the abnormal communication discrimination apparatus retains, in a storage section therein an eventual feature table that retains therein records each of which stores, for each abnormal communication detection event, a discrimination event class indicative of whether abnormal communication is caused by a cyber-attack or by a failure of the apparatus of the monitoring target system, and a statistical feature table that retains therein records each of which stores, for each condition in which a statistical amount of abnormal communication holds, a discrimination event class indicative of whether abnormal communication is caused by a cyber-attack or by a failure of the apparatus of the monitoring target system,
the abnormal communication discrimination apparatus further comprising an eventual evaluation section and a statistical evaluation section wherein, the eventual evaluation section calculates, on a basis of the received abnormal communication detection information, an eventual evaluation value from each number of records to which the abnormal communication detection events of the eventual feature table are applicable and in which a value of the discrimination event class indicates whether abnormal communication is caused by a cyber-attack or by a failure of the apparatus of the monitoring target system,
the statistical evaluation section calculates a statistical amount of abnormal communication from the received abnormal communication detection information, and
on a basis of the calculated statistical amount of abnormal communication, a statistical evaluation value from each number of records each of which satisfies a condition that a statistical amount of abnormal communication of the statistical feature table holds, the each number indicating whether abnormal communication is caused by a cyber-attack or by a failure of the apparatus of the monitoring target system,
the abnormal communication discrimination apparatus further comprising an abnormal communication class discrimination section that calculates, on a basis of the eventual evaluation value and the statistical evaluation value, a discrimination result evaluation value indicative of whether abnormal communication is caused by a cyber-attack or by a failure of the apparatus of the monitoring target system, and generates, on a basis of the discrimination result evaluation value, a discrimination result evaluation of a text indicative of evaluation of whether abnormal communication is caused by a cyber-attack or by a failure of the apparatus of the monitoring target system,
the abnormal communication discrimination apparatus being connected to a management system network that transmits discrimination result information including the abnormal communication detection information and the discrimination result evaluation to the manager terminal,
the manager terminal retains therein the abnormal communication detection information and an abnormal communication response information table that retains records each stores a response plan for abnormal communication for each abnormal communication arising from a cyber-attack and each abnormal communication arising from a failure of the apparatus of the monitoring target system, the manager terminal displays, on a basis of the received discrimination result information, an abnormal communication response screen that displays the abnormal communication detection information, the discrimination result evaluation, and response plans for abnormal communication, the manager terminal accepts selection of a response plan for abnormal communication from the manager, generates abnormal communication response information on a basis of the selection of the response plan, and transmits the abnormal communication response information to the abnormal communication response apparatus, and the control information transmission section of the abnormal communication response apparatus transmits control information to the apparatus of the monitoring target system on a basis of the received abnormal communication response information.

\* \* \* \* \*